(12) United States Patent
Okada et al.

(10) Patent No.: US 7,057,853 B2
(45) Date of Patent: Jun. 6, 2006

(54) MAGNETIC HEAD

(75) Inventors: Yasuyuki Okada, Odawara (JP); Hiroyuki Hoshiya, Odawara (JP); Yoshiaki Kawato, Tokyo (JP)

(73) Assignee: Hitachi Global Storage Technologies Japan, Ltd., Kanagawa-ken (JP)

( * ) Notice: Subject to any disclaimer, the term of this patent is extended or adjusted under 35 U.S.C. 154(b) by 169 days.

(21) Appl. No.: 10/610,792

(22) Filed: Jul. 2, 2003

(65) Prior Publication Data
US 2004/0120074 A1 Jun. 24, 2004

(30) Foreign Application Priority Data
Dec. 20, 2002 (JP) .............................. 2002-369176

(51) Int. Cl.
*G11B 5/147* (2006.01)
(52) U.S. Cl. ..................................... 360/126
(58) Field of Classification Search ................ 360/317, 360/126; 460/317, 324.1
See application file for complete search history.

(56) References Cited

U.S. PATENT DOCUMENTS

| | | | |
|---|---|---|---|
| 6,618,227 B1* | 9/2003 | Yano et al. ................. | 360/317 |
| 6,801,392 B1* | 10/2004 | Kawasaki et al. .......... | 360/126 |
| 6,819,530 B1* | 11/2004 | Gill ............................. | 360/314 |
| 6,937,447 B1* | 8/2005 | Okuno et al. ............. | 360/324.1 |
| 2004/0004786 A1* | 1/2004 | Shukh et al. ............... | 360/126 |
| 2004/0075927 A1 | 4/2004 | Gill | |
| 2004/0252415 A1* | 12/2004 | Shukh et al. ............... | 360/317 |
| 2004/0264047 A1* | 12/2004 | Ju et al. ..................... | 360/126 |

FOREIGN PATENT DOCUMENTS

| | | |
|---|---|---|
| JP | 02-061572 | 6/1989 |
| JP | 07-135111 | 11/1993 |
| JP | 07-169026 | 8/1994 |

OTHER PUBLICATIONS

P. Grunberg, J. Barnas, F. Saurenbach, J.A. FuB, A. Wolf and M. Vohl, "Layered magnetic structures: antiferromagnetic type interlayer coupling and magnetoresistance due to antiparallel alignment", Journal of Magnetism and Magnetic Materials, vol. 93, 1991, pp. 58-66.

* cited by examiner

*Primary Examiner*—Tianjie Chen
(74) *Attorney, Agent, or Firm*—Reed Smith LLP; Stanley P. Fisher, Esq.; Juan Carlos A. Marquez, Esq.

(57) ABSTRACT

The disclosed invention provides a magnetic head of high stability in which "erase after write" is prevented. Here is provided a magnetic head comprising a thin-film magnetic head for perpendicular magnetic recording, the thin-film magnetic head including a main pole with its tip facing a magnetic recording medium and coils for exciting the main pole, wherein the tip of or at least a part of the main pole consists of a soft magnetic multilayer containing laminations, each of which comprises a first ferromagnetic film, a second ferromagnetic film, and an antiparallel coupling layer formed between the first ferromagnetic film and the second ferromagnetic film, wherein the antiparallel coupling layer causes antiferromagnetic interlayer coupling of the first ferromagnetic film and the second ferromagnetic film.

27 Claims, 19 Drawing Sheets

FIG. 2A
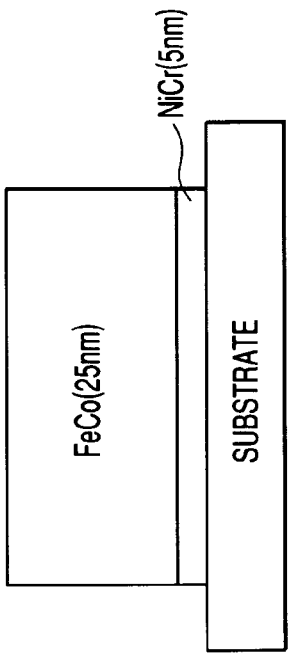
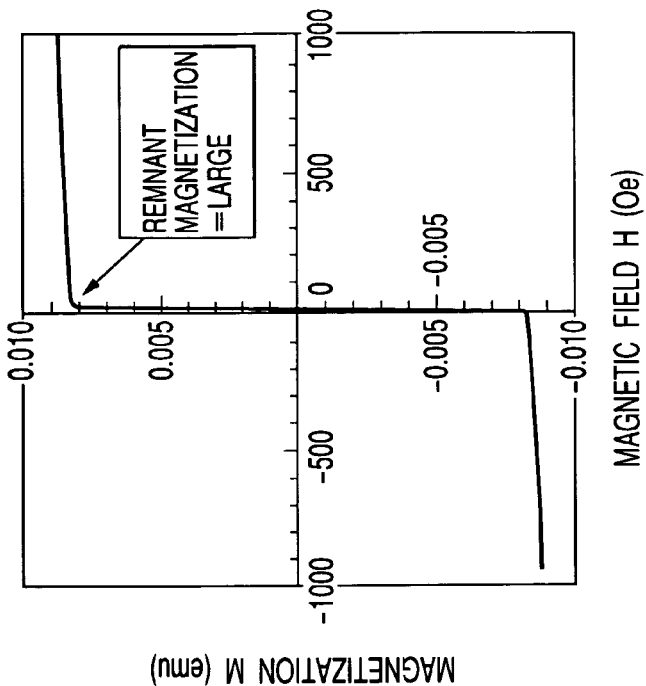
FIG. 2B
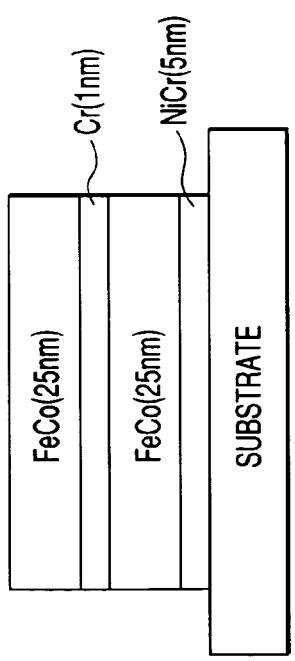
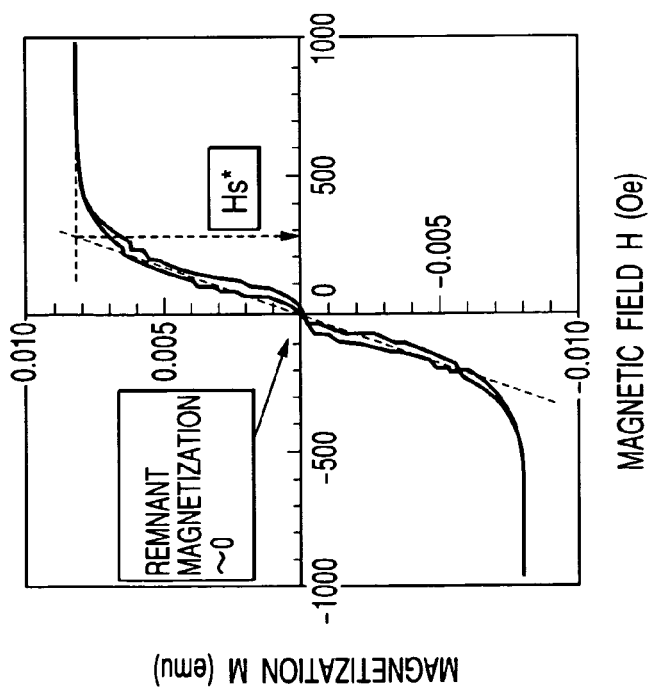

ADDITIVE AMOUNT 0 at%

ADDITIVE AMOUNT 8 at%

ADDITIVE AMOUNT 16 at%

ADDITIVE AMOUNT 20 at%

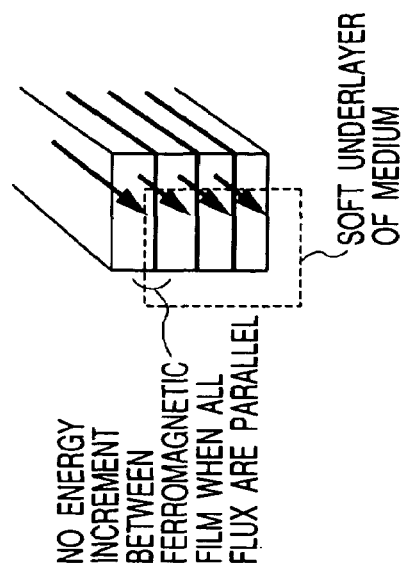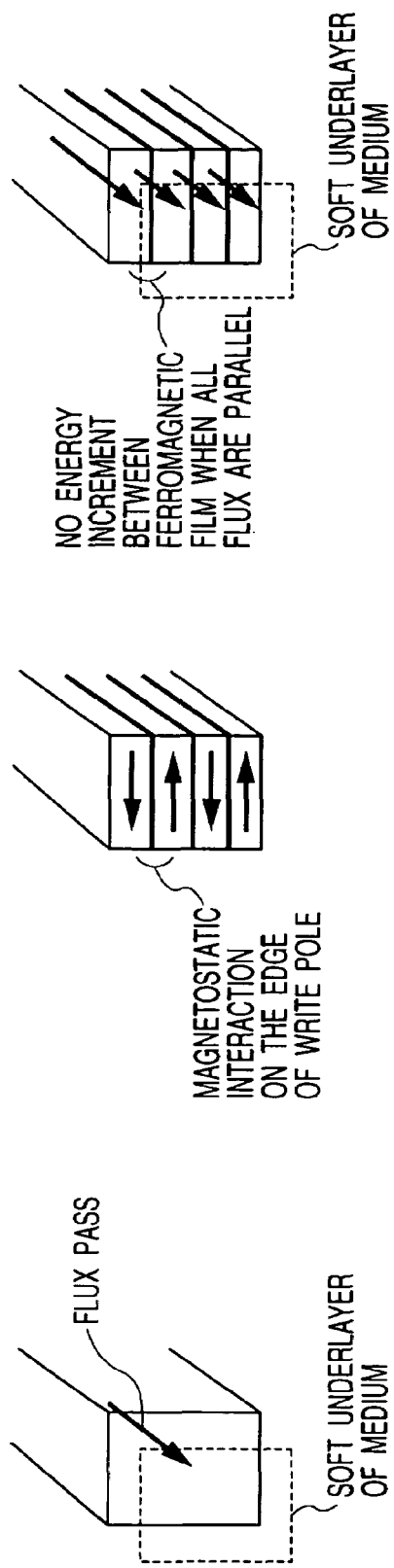

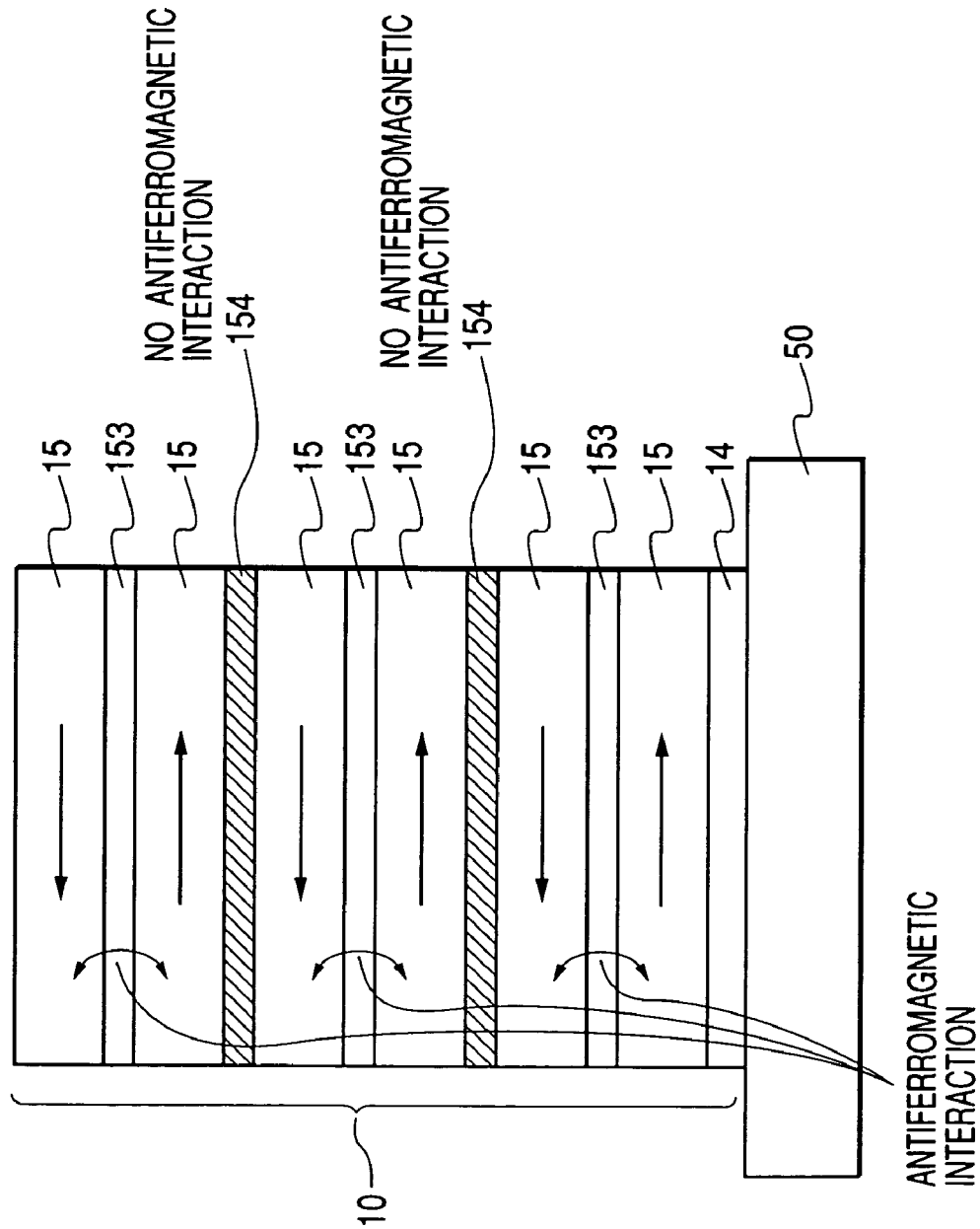

MAGNETIC HEAD

BACKGROUND OF THE INVENTION

1. Field of the Invention

The present invention relates to magnetic heads and, more particularly, to magnetic heads of a perpendicular magnetic recording type.

2. Description of the Related Art

A magnetic field sensor using antiparallel coupled magnetic films has been described in Japanese Patent Document 1 as a prior art reference. It has been discussed in Non-Patent Document 1 that antiparallel coupling takes place in multilayers or sandwich layers of Fe/Cr, Fe/Cu, Co/Cr, Co/Ru, and the like. A magnetic multilayer consisting of multiple layers of soft magnetic films and a magnetic head in which such a magnetic multilayer is employed to constitute a magnetic pole or a yoke have been described in Japanese Patent Document 2 as a prior art reference. A spin-valve sensor using antiferromagnetically coupled films has been described in Japanese Patent Document 3 as a prior art reference.

[Japanese Patent Document 1]

Japanese Unexamined Patent Application Publication No. Hei 2-61572

[Japanese Patent Document 2]

Japanese Unexamined Patent Application Publication No. Hei 7-135111

[Japanese Patent Document 3]

Japanese Unexamined Patent Application Publication No. Hei 7-169026

[Non-Patent Document 1]

Journal of Magnetism and Magnetic Materials, 93 (1991), pp. 58–66

BRIEF SUMMARY OF THE INVENTION

Prior art magnetic head technology has limitations in producing magnetic recording devices with a sufficiently high recording density, particularly, in producing magnetic heads with good performance enough to perform submicron trackwidth magnetic recording and read such tracks accurately, and it has been difficult to achieve functionality as a storage device. The reason lies in the properties of soft magnetic films and the demagnetizing field thereof. In order to allow magnetic action to take place at a high frequency and with sufficient sensitivity and stability, so-called soft magnetic thin films having a high permeability are necessary.

Nowadays, however, with great enhancement in magnetic recording density, recording bits are becoming smaller and smaller in the order of submicrons and the stable performance of soft magnetic thin films is becoming difficult to sustain. The reason is that, at the ends of the soft magnetic films by which smaller magnetic circuits have been formed, a magnetic domain structure is produced by the demagnetizing fields of the soft magnetic films and such a magnetic domain affects magnetic recording performance. Especially, perpendicular recording type thin-film magnetic heads have suffered from the following problem. The magnetic pole comes to have the magnetic domain structure after recording action is performed and the resultant remnant magnetization in the magnetic pole erases or disturbs information recorded as magnetized bits on a recording medium.

As a method for reducing the influence of the demagnetizing fields, a technique has heretofore been known that stacks soft magnetic films and non-magnetic films to form a multilayer and generates magnetostatic coupling in the ends of the multilayer for single domain formation. However, as the single domain formation by the magnetostatic coupling results from the magnetostatic coupling in the ends of the multilayer, accordingly, the coupling force is weak and a sufficient effect is not obtained.

In a multilayer in which non-magnetic metal layers and ferromagnetic metal layers are stacked alternately, such a phenomenon has lately been found that the ferromagnetic metal layers are antiferromagnetically coupled across a non-magnetic metal layer. Here, the "antiferromagnetic coupling" means that, in adjacent ferromagnetic layers, coupling energy is generated such that their magnetization acts in antiparallel directions with each other across the in-between non-magnetic metal layer. Through application of this phenomenon, magnetic sensors and the like have been proposed, as typically described in Japanese Patent Document 4 as a prior art reference specified below:

Japanese Patent Document 4, Japanese Unexamined Patent Application Publication No. Hei 2-61572

Although the physical reason for the phenomenon of mutually antiparallel magnetization coupling occurring in multilayer films has not been well explained, it is experimentally known that the above phenomenon occurs with combination of specific materials and thickness. For example, Non-Patent Document 1 states that antiparallel coupling takes place in multilayers or sandwich layers of Fe/Cr, Fe/Cu, Co/Cr, Co/Ru, and the like.

More specifically, depending on the thickness of the in-between non-magnetic film, for example, a Cr film, the force of the above antiparallel coupling of the ferromagnetic films across the non-magnetic film increases and decreases as close as fluctuation or is generated or lost. It is known that stable antiparallel coupling of the ferromagnetic films takes place when the thickness of the in-between non-magnetic film such as the Cr film is around 1 nm and in a range of 2–3 nm. As a proposal of application of this phenomenon to magnetoresistive sensors, Japanese Patent Document 3 described a spin valve sensor using antiferromagnetically coupled films.

In the present invention, in order to provide a magnetic head capable of a high recording density, a soft magnetic film structure which is employed in the above magnetic head, especially, a main pole in a perpendicular recording head structure is constituted by a multilayer consisting of soft magnetic and ferromagnetic films which are antiferromagnetically coupled.

Essentially, the present invention provides a magnetic head comprising a thin-film magnetic head for perpendicular magnetic recording, the thin-film magnetic head including a main pole with its tip facing a magnetic recording medium and coils for exciting the main pole, wherein the tip of or at least a part of the main pole consists of a soft magnetic multilayer containing laminations, each of which comprises a first ferromagnetic film, a second ferromagnetic film, and an antiparallel coupling layer formed between the first ferromagnetic film and the second ferromagnetic film, wherein the antiparallel coupling layer causes antiferromagnetic interlayer coupling of the first ferromagnetic film and the second ferromagnetic film.

In order to obtain the soft magnetic multilayer in which the ferromagnetic films are antiferromagnetically coupled, the above multilayer comprises minimum sets of ferromagnetic, antiparallel coupling, and ferromagnetic films, and the ferromagnetic films and the antiparallel coupling film are made of predetermined materials, respectively, and formed in a planar stratified structure with predetermined thicknesses per film.

Also, a return pole and magnetic shields may be constituted by the foregoing soft magnetic multilayer in which ferromagnetic films are antiferromagnetically coupled, respectively.

BRIEF DESCRIPTION OF THE DRAWINGS

FIGS. 2A and 2B show comparison in magnetic properties between the soft magnetic multilayer employed in the present invention and a commonly employed soft magnetic layer.

FIGS. 16A through 16E show schematic diagrams of magnetization states of the main pole of a perpendicular magnetic recording head for explaining the effect and principles of the present invention.

FIG. 20 shows another example of structure of the soft magnetic multilayer employed in the magnetic head of the present invention.

DETAILED DESCRIPTION OF THE PREFERRED EMBODIMENTS

Figure 1:
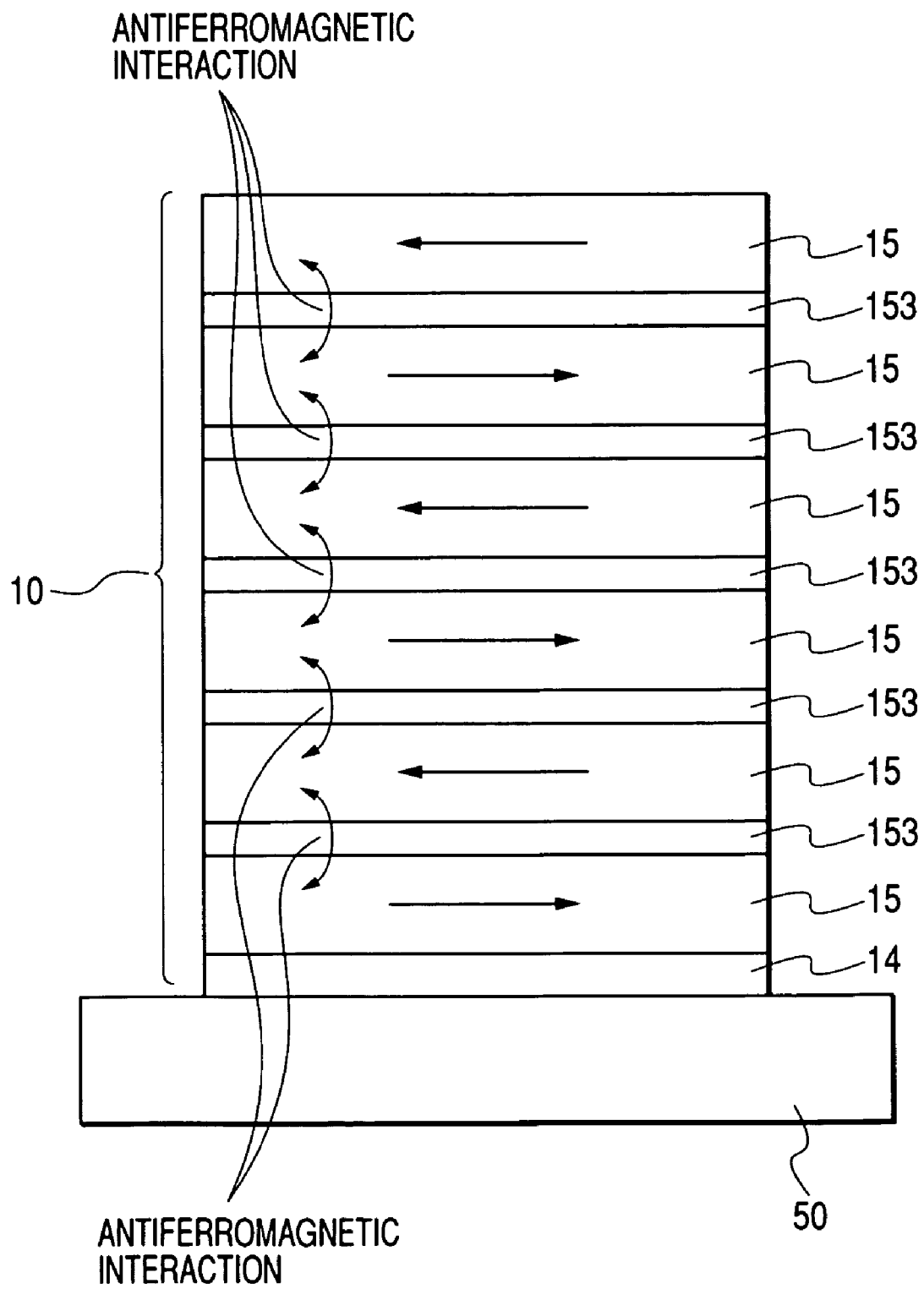
FIG. 1 is an example of structure of the soft magnetic multilayer employed in the magnetic head of the present invention.

As a magnetic head to which the present invention applies, for example, there is provided a magnetic head comprising a thin-film magnetic head for perpendicular magnetic recording, the thin-film magnetic head including a main pole with its tip facing a magnetic recording medium and coils for exciting the main pole, wherein the tip of or at least a part of the main pole consists of a soft magnetic multilayer containing laminations, each of which comprises a first ferromagnetic film, a second ferromagnetic film, and an antiparallel coupling layer formed between the first ferromagnetic film and the second ferromagnetic film, wherein the antiparallel coupling layer causes antiferromagnetic interlayer coupling of the first ferromagnetic film and the second ferromagnetic film.

The materials of the ferromagnetic films and in-between antiparallel coupling film are determined, according to predetermined combinations. If the ferromagnetic films are of a body centered cubic structure, it is desirable that the antiparallel coupling film comprises Cr or Ru as its principal constituent. Instead of Ru, Os, Ir, Re, or Rh may be used to obtain the same effect. It may be preferable, if appropriate, to dope another element such as, for example, Fe into a Cr or Ru film to reduce the antiferromagnetic coupling energy, provided the dose of the dopant should be 20 atomic percent and below.

If the ferromagnetic films are of a face centered cubic structure, it is desirable that the antiparallel coupling film comprises Ru as its principal constituent. Instead of Ru, Os, Ir, Re, Rh, or Cu may be used to obtain the same effect. It may be preferable, if appropriate, to dope another element such as, for example, Fe into an Ru film to reduce the antiferromagnetic coupling energy, provided the dose of the dopant should be 20 atomic percent and below.

In either cases, when the thickness of the antiparallel coupling film falls within a range of 0.5–1.2 nm or a range of 1.8–3 nm, stable antiferromagnetic coupling energy is obtained.

The above soft magnetic multilayer in which ferromagnetic films are antiferromagnetically coupled must be formed in a planar stratified structure with minimized concavity and convexity so that what is called an orange-peel effect which impedes the antiferromagnetic coupling does not take place. To accomplish this, it is necessary to optimize the conditions for fabricating the soft magnetic multilayer and the ferromagnetic film thickness must be limited to, specifically, one micron and less. Besides, it is preferable to form a NiCr underlayer or the like, about 5 nm thick, under the multilayer in order to prevent crystal grains from becoming too coarse in the soft magnetic multilayer.

In an example in which a ferromagnetic multilayer of the present invention is employed in a magnetic head for perpendicular recording, reversal of magnetization of a magnetic pole must take place readily in response to an external magnetic field. In view hereof, the ferromagnetic multilayer must be configured to have a proper value of antiferromagnetic interlayer coupling. Specifically, proper combinations of the materials and thickness of the ferromagnetic films and the antiparallel coupling film should be used. Moreover, the ferromagnetic multilayer thickness should be 10 nm and above, and the dose of a dopant to the antiparallel coupling film should be 20 atomic percent and below. Having been designed in this way, the soft magnetic multilayer will be capable of having antiferromagnetic coupling having a field correspondent to several dozen to several hundred oersteds and a magnetic head with a high permeability and stable performance can be realized.

With reference to the accompanying drawings, an example of the magnetic head to which the present invention applies will be described in detail hereinafter.

Thin films constituting the soft magnetic multilayer of the present invention were formed by an rf (radio-frequency) magnetron sputtering apparatus as will be described below.

In an atmosphere of 1 to 6 mTorr argon, on a ceramics substrate, the multilayer films were formed by sequentially depositing the layers of the following materials. As sputtering targets, nickel plus 20 at % Cr alloy, copper, iron plus 30 at % cobalt, chromium, and ruthenium targets were used. A 1 cm square chip of Ni or the like was disposed on the iron plus cobalt target, if appropriate, and a FeCoNi film was deposited. The multilayer was formed such that plasma was generated inside the apparatus by applying rf power to the cathodes on which the targets were disposed respectively and the layers were formed sequentially by opening the shutters of the cathodes in sequence. Co-sputter applied to some of film deposition; that is, the chromium target and the FeCo target were discharged at the same time to form a chromium and FeCo alloy layer.

During film deposition, by using a permanent magnet, a magnetic field of about 6.4 kA/m (80 oersteds) was applied in parallel to the substrate, thus inducing uniaxial magnetic anisotropy. The elements on the substrate were formed by being patterned through a photoresist process. Then, the substrate was integrated with a slider and mounted on the host magnetic recording device. Specific embodiments of the present invention will be explained hereinafter by following the drawings.

FIG. 1 is an example of structure of the soft magnetic multilayer employed in the magnetic head of the present invention. A soft magnetic multilayer 10 in which ferromagnetic films are antiferromagnetically coupled is formed such that an underlayer 14 is formed on a substrate 50 and sets of a ferromagnetic film (first ferromagnetic film) 15, an antiparallel coupling film 153, and a ferromagnetic film (second ferromagnetic film) 15 are layered in order repeatedly. The material, thickness, and deposition condition of the antiparallel coupling film are adjusted so that antiferromagnetic coupling energy is exerted to make adjacent ferromagnetic films 15 magnetized in directions antiparallel with each other across the antiparallel coupling film 153. The details hereof will be described later.

Though the use of the above multilayer in which ferromagnetic films are antiferromagnetically coupled, stable antiparallel magnetic domain states can be achieved. For example, by observing magnetic domain states from the air-bearing surface of the magnetic head through Spin-SEM or Magnetic Energy Microscopy (MFM), antiparallel closed domains can be found. Even in the case of simply multilayered films, closed domain states can also be found partially. However, stable closed domain states can be realized by the present invention.

FIG. 2 shows comparison in magnetic properties between the soft magnetic multilayer employed in the present invention and a commonly employed soft magnetic layer. FIG. 2A shows a magnetization curve along an easy axis of magnetization for the soft magnetic multilayer employed in the present invention, wherein FeCo films are used as ferromagnetic films and two layers of FeCo films are antiferromagnetically coupled across a 1 nm thick Cr antiparallel coupling film. It is seen that the magnetization curve is plotted symmetrically in the positive and negative domains of the magnetic field as if the curve was divided into two loops, which represents mutually antiparallel vectors of magnetization in the two layers of FeCo films under the effect of the antiferromagnetic coupling energy.

Magnetic energy increase up to saturation in the magnetic field found in this magnetization curve is a value determined by the thickness and structure of the ferromagnetic films and antiparallel coupling film, not a physical quantity proper to the ferromagnetic films like what is called an anisotropy field due to uniaxial magnetic anisotropy. Although integration of the magnetization curve should be performed for precise evaluation of antiferromagnetic coupling, here, a line approximating the magnetization curve as shown in FIG. 2A is simply drawn to follow the increase of magnetization up to saturation and thereby a value of saturation magnetic field Hs* is obtained.

The reason is that the value of saturation magnetic field Hs* virtually describes the magnetization curve of the soft magnetic multilayer employed in the present invention and, if, for example, saturation flux density Bs (in units of Teslas) is used, an effective permeability of the soft magnetic multilayer having saturation magnetic field Hs* (in oersteds) is approximately evaluated by "permeability~Bs×10000/Hs*."

Meanwhile, a magnetization curve of the FeCo single-layer film example in which the antiparallel coupling film is not used is shown FIG. 2B for comparison. Unlike the curve shown in FIG. 2A, no significant saturation magnetic field is found in the magnetization curve shown in FIG. 2B. This is because the anisotropy field due to uniaxial magnetic anisotropy is found in the single-layer film, but its magnetization is generally as strong as 20 oersteds and below.

Whether antiferromagnetic coupling takes place, using the antiparallel coupling film can be known from the form of the magnetization curve as shown in FIG. 2, and also distinguishable from the multilayer structure if the magnetization curve cannot be obtained by measurements. The multilayer structure which provides proper antiparallel coupling will be explained below.

Figure 3:
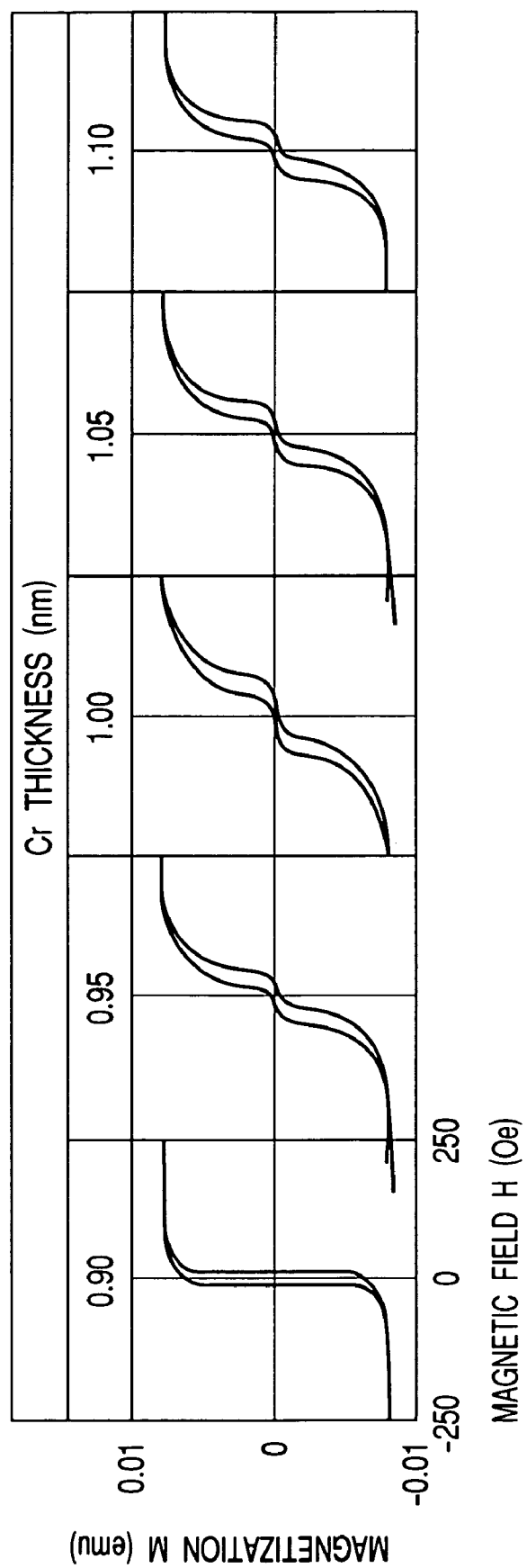
FIG. 3 shows magnetization curves of a FeCo/Cr/FeCo multilayer as the Cr film thickness varies.

FIG. 3 shows magnetization curves of a FeCo/Cr/FeCo multilayer as the Cr film thickness varies. It is seen that great change occurs in the magnetization curves when the Cr film thickness varies in a range of 0.9 to 1.1 nm. It is also seen that the magnetization curve when the Cr film is 0.9 nm thick has a large proportion of a remnant magnetization component and antiparallel coupling is not uniform. When the Cr film thickness has increased from 0.95 to 1, the remnant magnetization component becomes virtually zero and Hs* increases. As the Cr film becomes even thicker, Hs* decreases inversely.

Figure 4A:
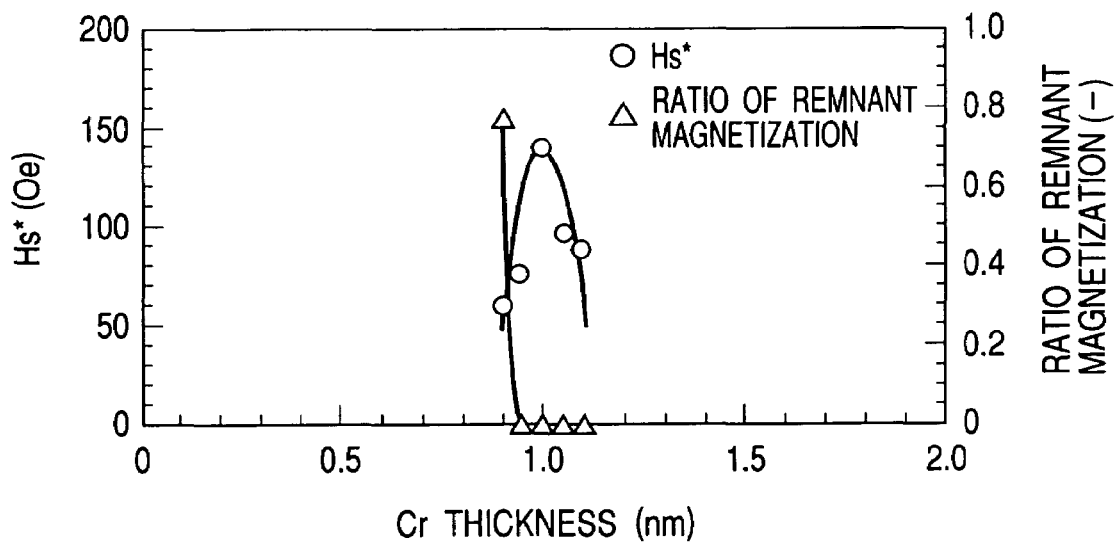
FIGS. 4A and 4B show change in remnant magnetization proportion and saturation magnetic field Hs* with change in the Cr film thickness and the FeCoNi film thickness.

FIG. 4 shows change in remnant magnetization proportion and saturation magnetic field Hs* with change in the Cr film thickness and the FeCoNi film thickness. FIG. 4A shows the above change with change in the Cr film thickness. It is seen that, as the antiparallel coupling layer, the Cr film thicknesses from 0.95 to 1.1 nm are good and 1.0 nm is the best among others.

Figure 4B:
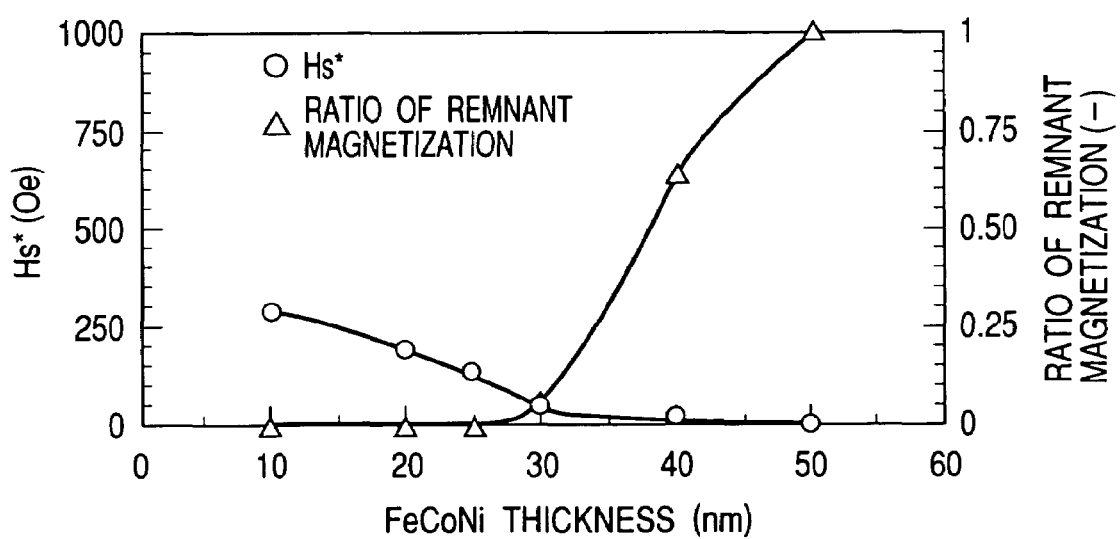

Similarly, FIG. 4B shows the corresponding change for a FeCoNi/Cr/FeCoNi multilayer with change in the FeCoNi film thickness. When the FeCoNi film is as thin as 10 nm, Hs* is as great as 300 oersteds. However, Hs* decrease as the FeCoNi film becomes thicker. Up to the FeCoNi film thickness of 30 nm, the remanant magnetization is little and there is a good antiparallel coupling state. However, for 40 nm and thicker FeCoNi films, Hs* is virtually zero and the remanant magnetization proportion is almost 1; that is, there is a state of none of antiparallel coupling.

Essentially, the energy of antiparallel coupling is determined by combinations of ferromagnetic films and an antiparallel coupling film and multilayer structure. The result of FIG. 4B is considered attributable to two factors. One factor is the fact that, as the ferromagnetic film thickness becomes thicker, the magnetic field which induces antiparallel coupling decreases inversely if the antiparallel coupling energy is constant. This is because the antiparallel coupling energy is the product of the quantity of magnetization in the ferromagnetic film=saturation flux density×thickness and the saturation magnetic field.

The other factor is that, with increase of the multilayer thickness, concavity and convexity in the multilayer increase, which produces an effect that magnetostatic coupling, what is called the orange-peel effect, takes place between adjacent ferromagnetic films and cancels the antiparallel coupling. Although such an effect of concavity and convexity can be mitigated to some degree by optimizing the conditions for fabricating the multilayer, our experiments indicated that antiparallel coupling is lost for 40–60 nm and thicker ferromagnetic films and a total multilayer thickness of 1.0 to 0.2 µm and thicker.

Figure 5:
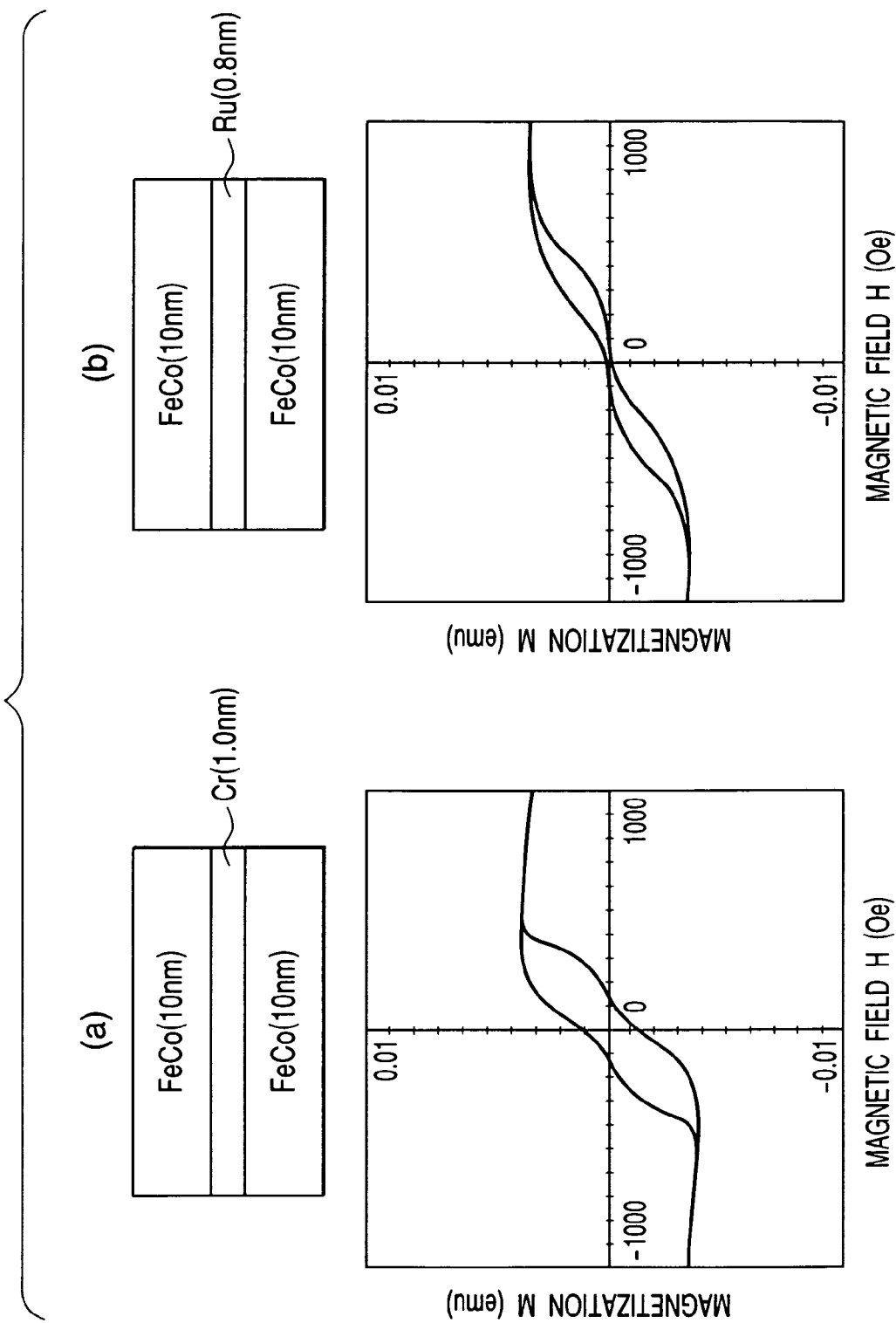
FIG. 5 shows magnetization curves of FeCo/Cr/FeCo and FeCo/Ru/FeCo multilayers.

FIG. 5 shows magnetization curves of FeCo/Cr/FeCo and FeCo/Ru/FeCo multilayers, where the FeCo films are 10 nm thick, Cr film is 1.0 nm, and Ru film is 0.8 nm thick. In the case of employing the Cr film, Hs* is about 300 oersteds; whereas, in the case of employing the Ru film, Hs* is about 600 oersteds. It was found that the antiparallel coupling energy in the case of employing the Ru film is almost double that energy in the case of employing the Cr film.

Figure 6:
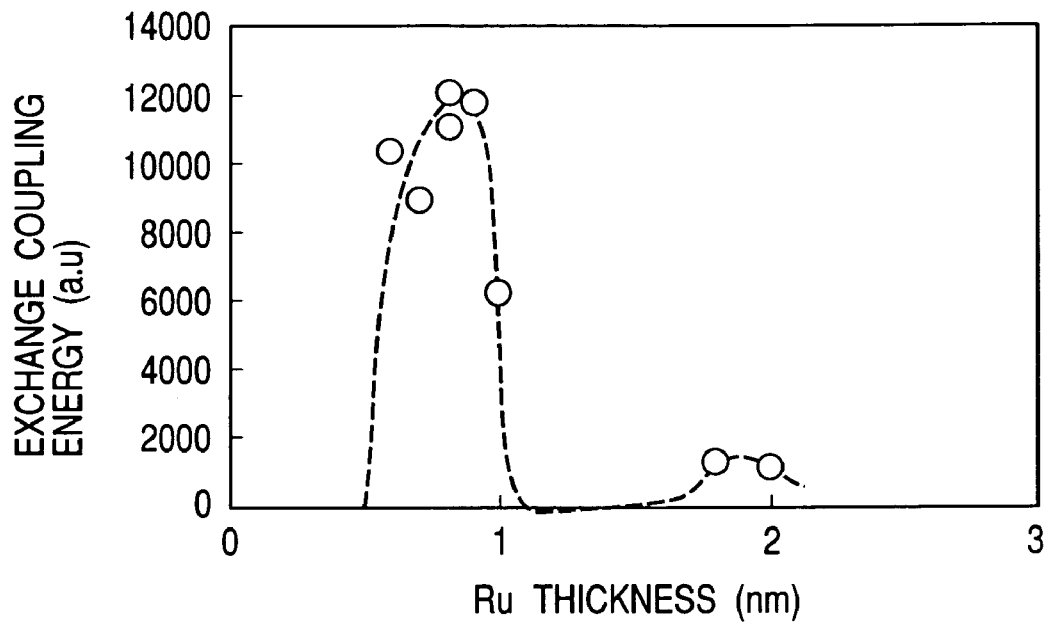
FIG. 6 shows change in antiparallel exchange coupling energy with change in the Ru film thickness.

FIG. 6 shows change in antiparallel exchange coupling energy with change in the Ru film thickness. The following characteristic was obtained. In the Ru film thickness range of 0.6 to 1.0 nm, antiparallel coupling takes place and its effect is good in the Ru film thickness range of 0.7 to 0.9 nm and the best with the Ru film thickness of 0.8 nm. Also, weak coupling energy was found around the Ru film thickness of 2 nm. As indicated from this result, the antiparallel coupling film thickness is, of course, a factor of changing the saturation magnetic field. Because antiparallel exchange coupling is quite sensitive to the thickness of the antiparallel coupling film as described for FIGS. 3, 4, 6, and 7, it is desirable to form the antiparallel coupling film with a thickness for which a peak of great stable coupling energy is obtained. Therefore, the antiparallel coupling film thickness should be determined properly, according to what material the film is made of.

Figure 7:
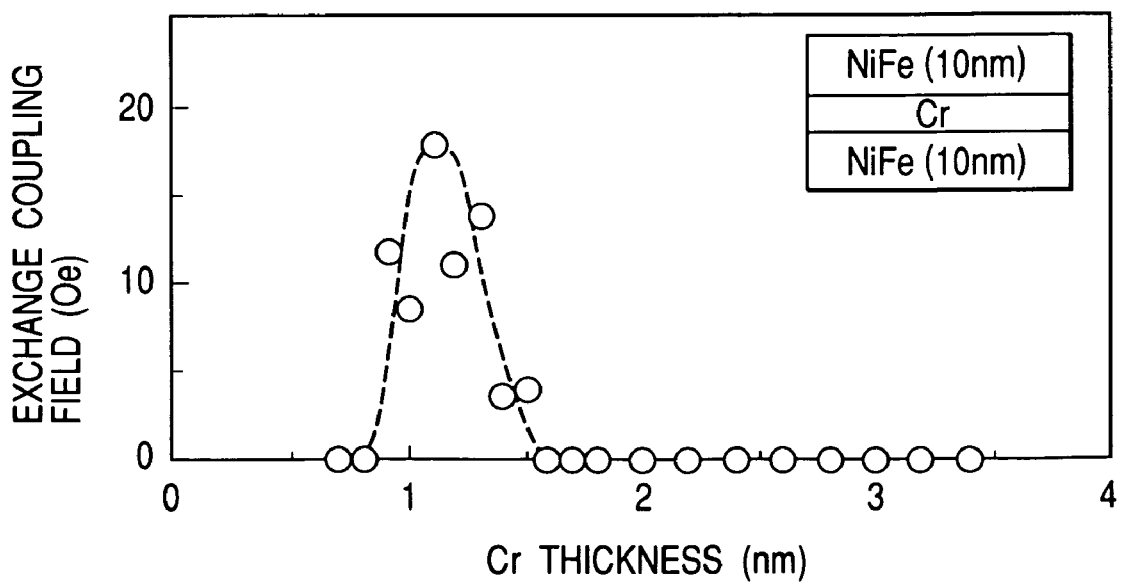
FIG. 7 shows change in antiparallel exchange coupling field for an NiFe/Cr/NiFe multilayer with change in the Cr film thickness.

FIG. 7 shows change in antiparallel exchange coupling field for an NiFe/Cr/NiFe multilayer with change in the Cr film thickness. Although the maximum antiparallel exchange coupling energy is obtained with the Cr film thickness of 1 nm as is the case for the FeCoNi/Cr/FeCoNi multilayer, the NiFe/Cr/NiFe multilayer differs from the FeCoNi/Cr/FeCoNi multilayer in that its saturation magnetic field is as small as 20 oersteds. As explained above, a variety of material combinations and thicknesses of ferromagnetic films and an antiparallel coupling film leads to variation in both the antiparallel coupling and the saturation magnetic field. Thus, best material combination and thicknesses of these films for best magnetic properties should be needed to obtain a soft magnetic multilayer capable of desirable antiparallel coupling performance.

Figure 8:
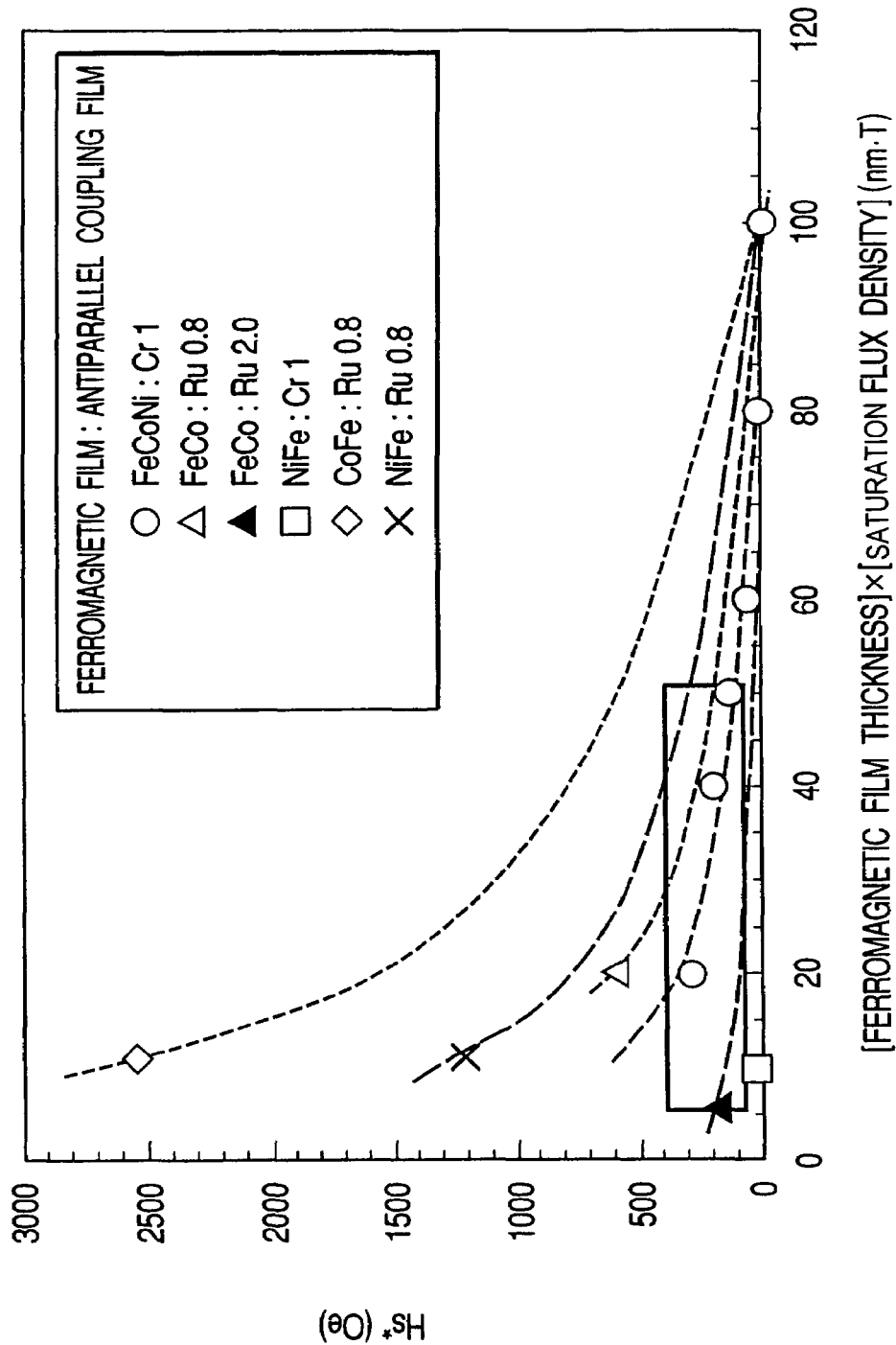
FIG. 8 shows relationship between saturation magnetic field energy and magnetization quantity in ferromagnetic films for a variety of material combinations of ferromagnetic films and an antiparallel coupling film.
Figure 9A:
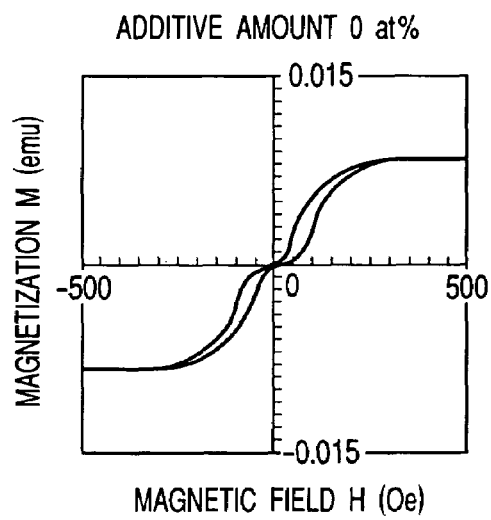
FIGS. 9A through 9D show magnetization curves for a multilayer of FeCo (25 nm)/CrFeCo (1 nm)/FeCo (25 nm) as the dose of FeCo doped into the Cr antiparallel coupling film changes.
Figure 9B:
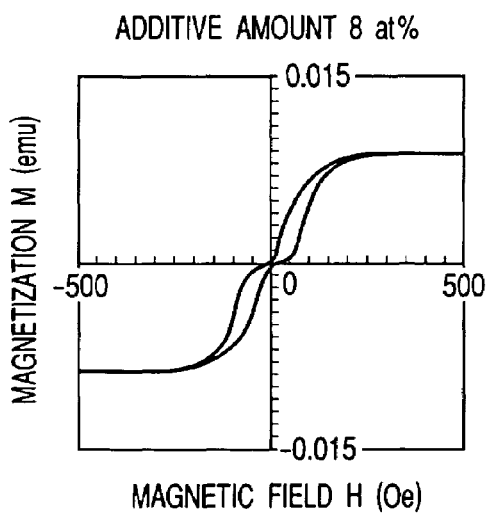
Figure 9C:
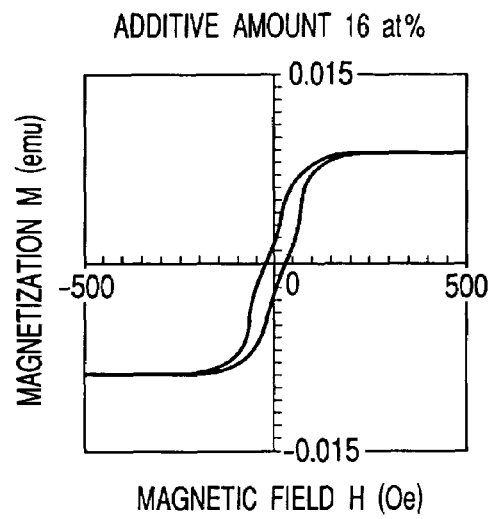
Figure 9D:
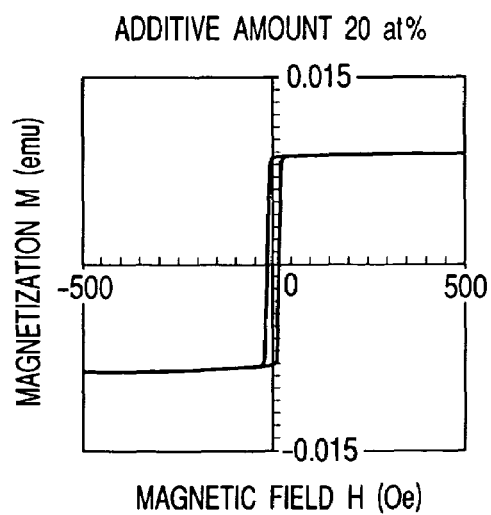

FIG. 8 shows relationship between saturation magnetic field and magnetization of ferromagnetic films for a variety of material combinations of ferromagnetic films and an antiparallel coupling film. The magnetization of ferromagnetic films is represented by the product of ferromagnetic film thickness and saturation flux density.

The saturation magnetic field decreases as the magnetic film thickness increases, which differs, according to ferromagnetic film and antiparallel coupling film material combinations. Thus, proper selection from a variety of material combinations and thicknesses of ferromagnetic films and an antiparallel coupling film is needed to obtain a soft magnetic multilayer with properly set saturation magnetic field Preferable material combinations of ferromagnetic films and an antiparallel coupling film with experimental values of antiparallel coupling film thickness and saturation magnetic field energy change conjectured to occur with each material combination are shown in FIG. 8. Meanwhile, an optimum value of saturation magnetic field can be determined from a viewpoint of soft magnetism. Simply speaking, permeability of a soft magnetic multilayer is determined by 10000× saturation flux density (in Teslas)/saturation magnetic field (in oersteds). Saturation flux density for ferromagnetic films is a maximum of 2.4 T in the case of FeCo films and 1T in the case of NiFe films and, therefore, is not a factor that greatly differs with film compositions as compared with other factors.

If a lower limit of required permeability is assumed to be 50, this value would be the lower limit for all kinds of soft magnetic thin-film multilayers. Similarly, a lower limit of saturation magnetic field is considered to be 20 oersteds. This is because the anisotropy magnetic field energy for a CoNiFe alloy thin-film multilayer is about 20 oersteds and, if the saturation magnetic field energy is lower than this value, the anisotropy magnetic field will be dominant and likely to suppress antiparallel coupling.

If saturation flux density is assumed to be 2T, upper and lower limits of saturation magnetic field can be defined from the above relation and saturation magnetic field should be set at 400 oersteds and below. The reason is that, with 400 oersteds and higher saturation magnetic field, permeability will be virtually 50 and below even if saturation flux density is 2T and, consequently, the soft magnetic multilayer functionality will be disabled. As seen from FIG. 4B, with 50 nm and thicker ferromagnetic films, the remanant magnetization proportion rises and, in such cases, also, the soft magnetic multilayer functionality will be disabled.

Conversely, with 5 nm and thinner soft magnetic multilayer structures, the volume of the soft magnetic multilayer is insufficient and the flux transmission function of the layer will be disabled. This disability can be rectified to some degree by further layering multiple ferromagnetic films of 5 nm thick and less, but, in this case, the number of antiparallel coupling films increases accordingly and this results in decrease in the total flux density and cost increase for multiple times of layer deposition.

In order to satisfy the above-discussed requirements, bounds corresponding to a bold rectangular marked off in the graph FIG. 8 should be put to the formation of the soft magnetic multilayer employed in the present invention; that is, within a range of 20–400 oersteds of saturation magnetic field and within a range of 5–50 nm of ferromagnetic film thickness.

According to what material the antiparallel coupling film is made of, the above bounds to be satisfied are more restricted. For the combination of FeCoNi ferromagnetic films and a Cr (1 nm) antiparallel coupling film, the ferromagnetic film thickness is further restricted to a range of about 20–50 nm to be satisfied.

Meanwhile, for the combination of CoFe ferromagnetic films and an Ru (0.8 nm) antiparallel coupling film, all portions of its curve do not satisfy the bounds even if the ferromagnetic film thickness is altered. Film material combinations to satisfy the above bounds are tabulated in Table 1. The table includes saturation flux density Bs for ferromagnetic films and crystal structure. This is because, even with minor charge in ferromagnetic film composition and with different dopant elements, the kinds of multilayers exhibit almost the same properties, provided Bs and crystal structure do not change much.

TABLE 1

| Ferromagnetic film (thickness) | Antiparallel coupling film (thickness) | Bs of ferromagnetic film | Crystal structure |
|---|---|---|---|
| FeCoNi (20–50 nm) | Cr (1 nm) | 2.0 T | bcc |
| FeCo (5–20 nm) | Ru (1.8–2.0 nm) | 2.4 T | bcc |
| FeCo (30–50 nm) | Ru (0.8 nm) | 2.4 T | bcc |
| NiFe (40–50 nm) | Ru (0.8 nm) | 1.0 T | fcc |
| CoFe (non-proper value) | Ru (0.8 nm) | 1.8 T | fcc |

In the meantime, antiferromagnetic coupling energy can be controlled somewhat by doping another element into the antiparallel coupling film. FIG. 9 shows magnetization curves for a multilayer of FeCo (25 nm)/CrFeCo (1 nm)/FeCo (25 nm) as the dose of FeCo doped into the Cr antiparallel coupling film changes. The following can be seen. With the dose of zero, saturation magnetic field energy of about 200 oersteds is obtained. As the dose of FeCo doped into the Cr film increases, the magnetization curve changes in which saturation magnetic field energy gradually decreases. When the dose of FeCo has reached 20 at %, there is almost no indication of antiferromagnetic coupling in the magnetization curve and remanant magnetization increases.

Figure 10:
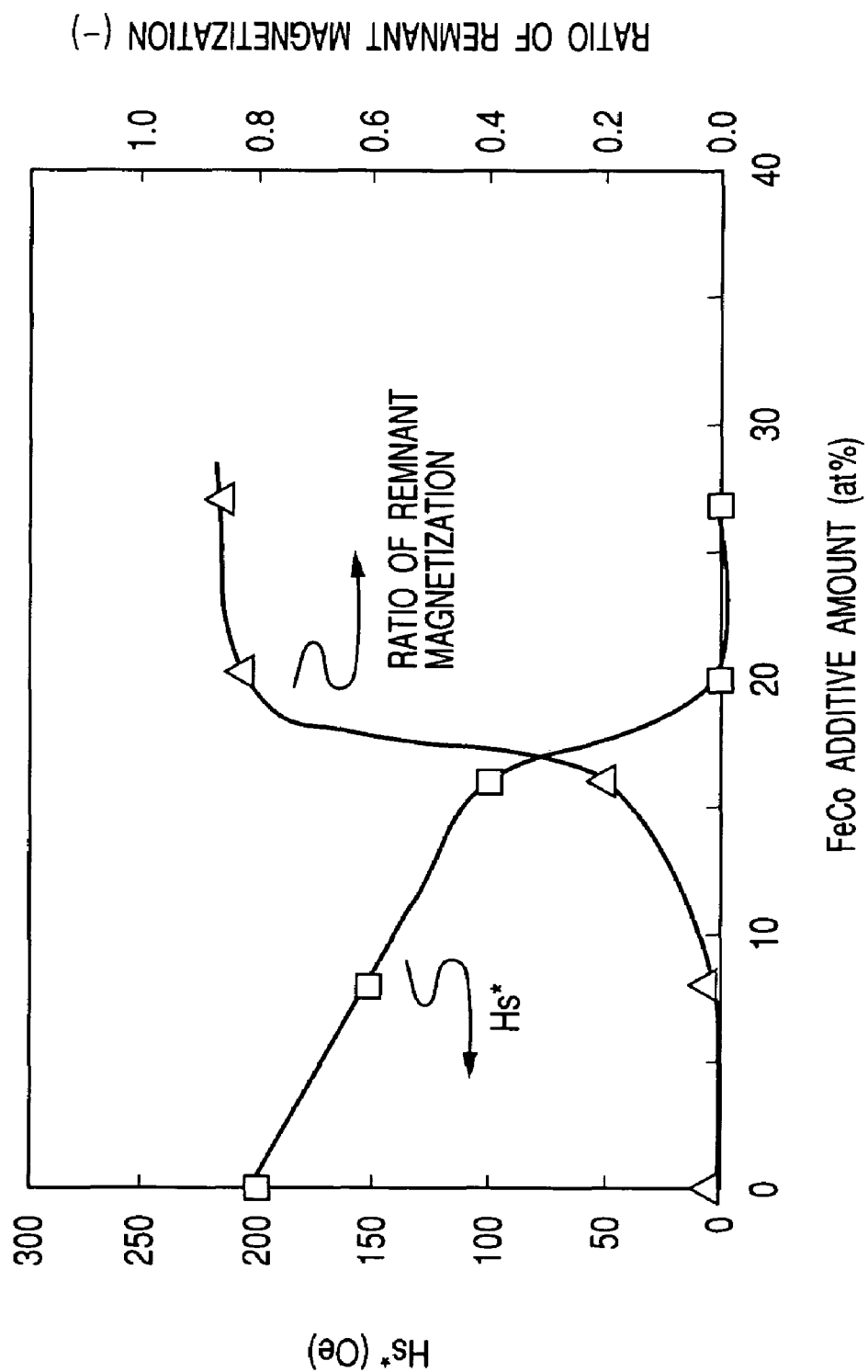
FIG. 10 shows change in saturation magnetic field energy and remnant magnetization proportion for the multilayer of FeCo (25 nm)/CrFeCo (1 nm)/FeCo (25 nm) with change in the dose of FeCo doped into the Cr film.

FIG. 10 shows change in saturation magnetic field energy and remanant magnetization proportion for the multilayer of FeCo (25 nm)/CrFeCo (1 nm)/FeCo (25 nm) with change in the dose of FeCo doped into the Cr film. The following can be seen. As the dose increases, the saturation magnetic field energy decreases and can be controlled to a half as much as the value of that energy with the dose of zero. However, in the domain of quite low saturation magnetic field with higher dose, a steep decrease of that energy with the rise of the dose and a steep increase in remanant magnetization proportion are found and, probably, proper properties are not obtained. Accordingly, the result of FIG. 10 indicated that proper doses of a dopant be 20 at % and below and saturation magnetic field can be decreased down to a half as much as the value of that energy for the multilayer without being doped.

Figure 11A:
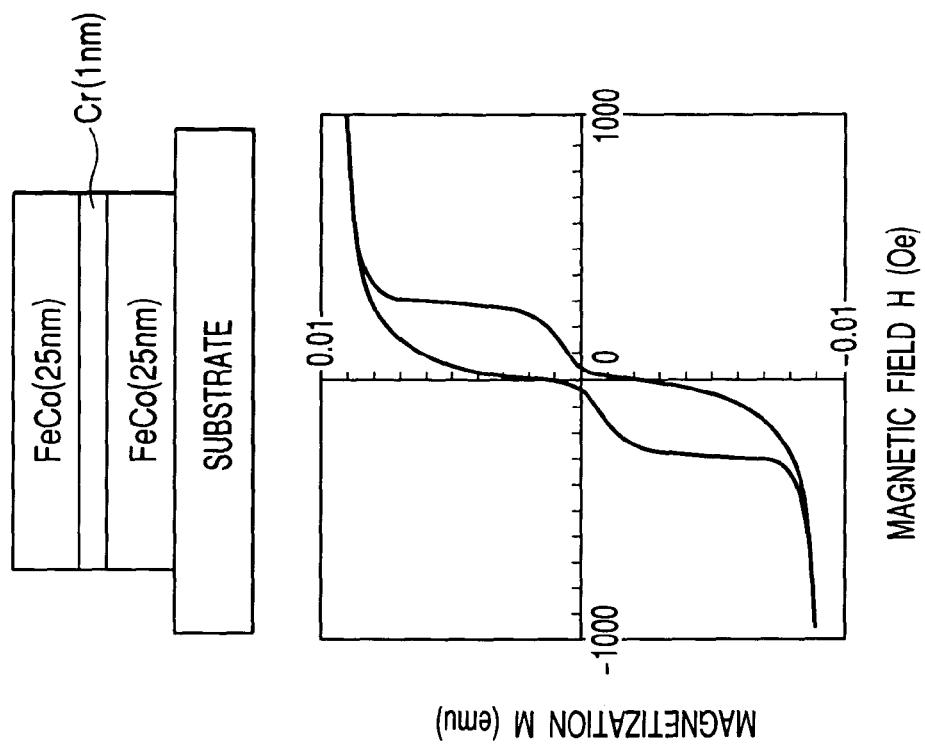
FIGS. 11A and 11B show magnetization curves for a multilayer example in which a NiCr film is employed as the underlayer and for a multilayer example without the underlayer.
Figure 11B:
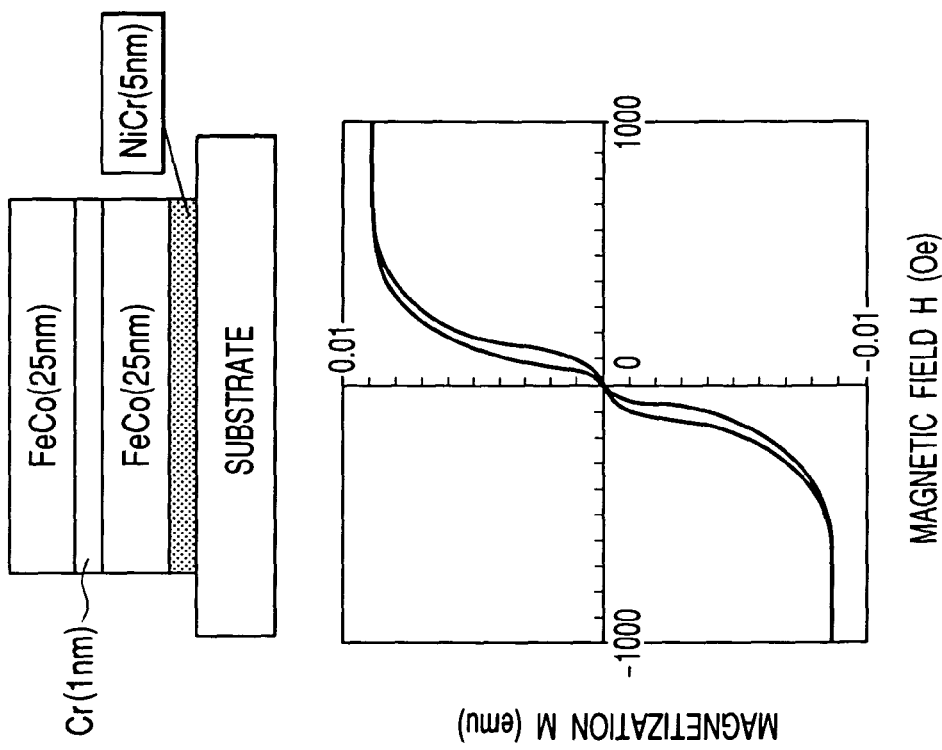

Further, the underlayer under the soft magnetic multilayer employed in the present invention will be described. In FIG. 1, the underlayer 14 is positioned under the soft magnetic multilayer of the present invention. FIG. 11 shows magnetization curves for a multilayer example in which a NiCr film is employed as the underlayer and for a multilayer example without the underlayer. The magnetization curve for the multilayer example in which the underlayer is employed, as explained for FIG. 2, clearly reflects antiferromagnetic coupling, whereas the magnetization curve for the multilayer example without the underlayer indicates increase in coercivity and antiferromagnetic coupling which is, however, not clear comparatively. This is because coercivity as much as saturation magnetic field induces a remanant magnetization component and, consequently, sufficient soft magnetic properties are not obtained in spite of a certain quantity of antiferromagnetic coupling energy. Therefore, it is advisable to employ a suitable underlayer such as NiCr and the like. Besides the NiCr film, Ti, Cr, Ru, and the like can produce the same effect to some degree.

Figure 12:
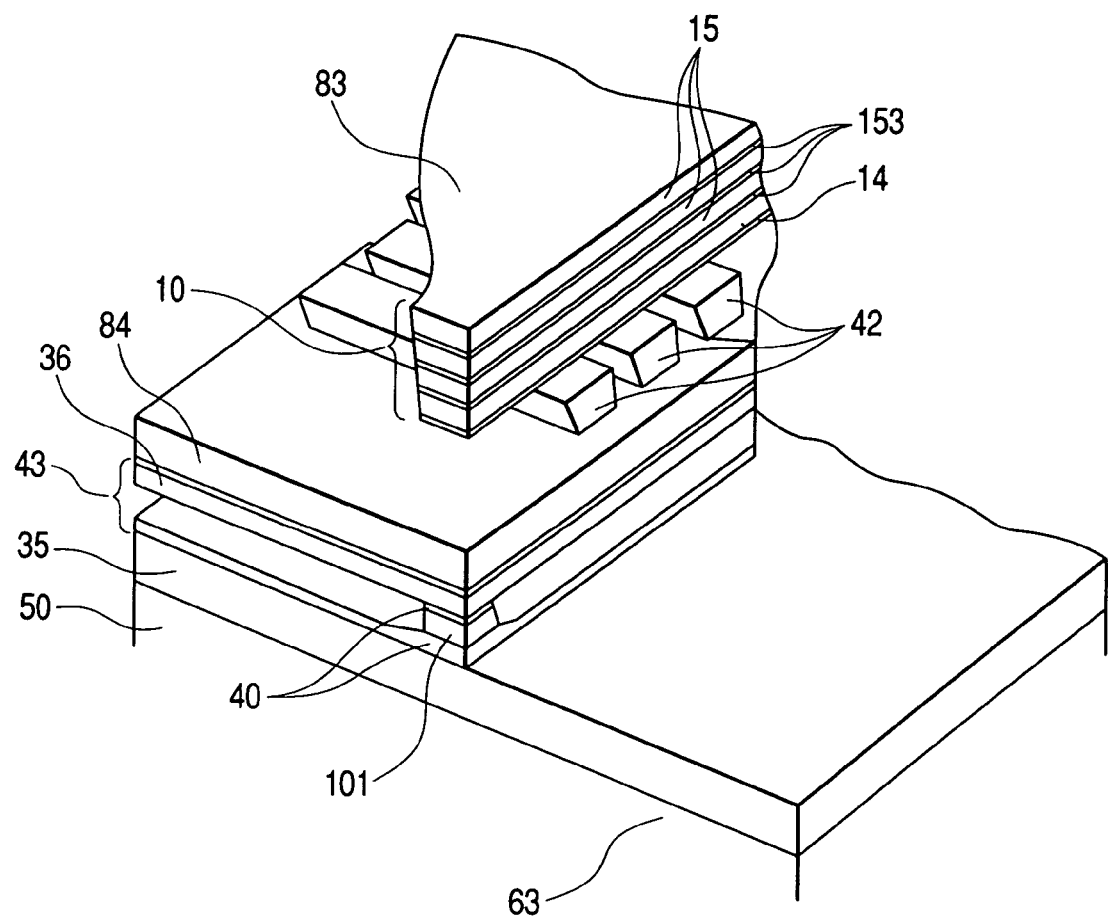
FIG. 12 shows an example of structure of a magnetic head for perpendicular recording in which the soft magnetic multilayer in which ferromagnetic films are antiferromagnetically coupled in accordance with the present invention is employed to constitute the main pole.

Magnetic head embodiments using the above-described soft magnetic multilayer in which ferromagnetic films are antiparallel coupled will be explained hereinafter. FIG. 12 shows an example of structure of a magnetic head for perpendicular recording in which the soft magnetic multilayer in which ferromagnetic films are antiferromagnetically coupled in accordance with the present invention is employed to constitute the main pole. On the substrate 50 which is integrated with the slider, a lower magnetic shield 35, an electrode 40, and a magnetoresistive multilayer 101 are formed and, moreover, another electrode 40 and an upper magnetic shield 36 are formed, and a read gap 43 which senses a readback signal is formed. While a TMR or CPP-GMR type readback sensor which causes current to flow in a layer thickness direction is shown here as a readback unit, it is possible to use another type of readback sensor such as GMR readback sensors which cause current to flow in an in-plane direction as the readback unit without altering the essential characteristics of the present invention.

The recording head further includes a return pole 84, coils 42, and a main pole 83 which form a magnetic circuit. In FIG. 12, the main pole 83 consists of a soft magnetic multilayer 10 in which ferromagnetic films are antiparallel coupled. On the underlayer 14, sets of the ferromagnetic film 15, antiparallel coupling film 153, and ferromagnetic film 15 are layered in order. It is preferable to stack 4–12 layers of ferromagnetic films 15 in the main pole. With a small number of layers, there is the fear of reducing the effect that magnetization and reverse magnetization cancel each other at the ends of the magnetic pole. With too many layers, the recording capability decreases. Thus, 6 to 8 layers are most desirable. It is desirable to stack an even number of ferromagnetic film layers so that magnetization and reverse magnetization will cancel each other between adjacent two among the ferromagnetic films disposed to be magnetized in antiparallel directions. On the magnetic head, an air-bearing surface 63 is formed which approaches a magnetic recoding medium and performs magnetic recording and readback.

Figure 13:
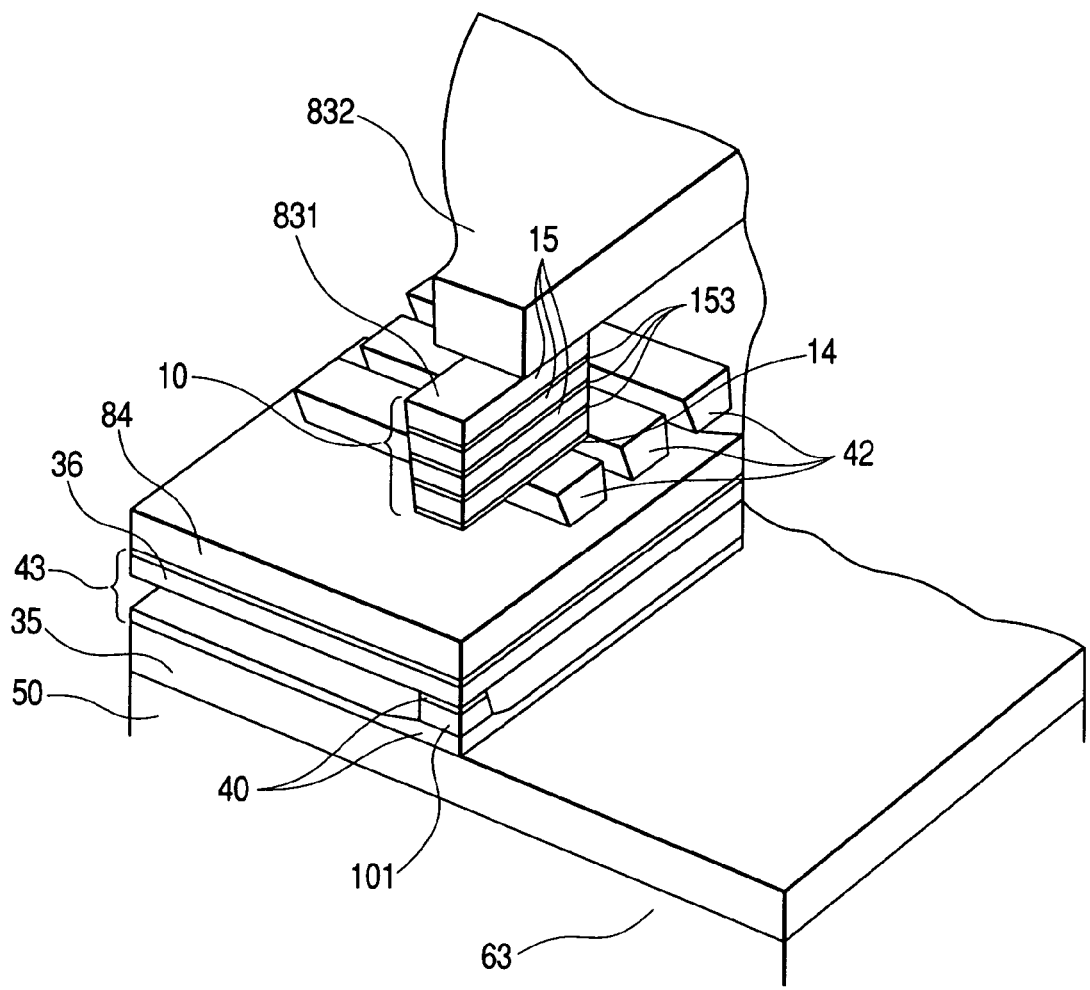
FIG. 13 shows another example of structure of a magnetic head for perpendicular recording in which the soft magnetic multilayer in which ferromagnetic films are antiferromagnetically coupled in accordance with the present invention is employed to constitute the main pole.

FIG. 13 shows another example of structure of a magnetic head for perpendicular recording in which the soft magnetic multilayer in which ferromagnetic films are antiferromagnetically coupled in accordance with the present invention is employed to constitute the main pole. On the substrate 50 which is integrated with the slider, the lower magnetic shield 35, one electrode 40, and the magnetoresistive multilayer 101 are formed and, moreover, another electrode 40 and the upper magnetic shield 36 are formed, and the read gap 43 which senses a readback signal is formed. While the TMR or CPP-GMR type readback sensor which causes current to flow in the layer thickness direction is shown here as the readback unit, it is possible to use another type of readback sensor such as GMR readback sensors which cause current to flow in the in-plane direction as the readback unit without altering the essential characteristics of the present invention.

The recording head further includes the return pole 84, coils 42, a first main pole 831, and a second main pole 832 which form a magnetic circuit. In FIG. 13, the first main pole 831 consists of the soft magnetic multilayer 10 in which ferromagnetic films are antiparallel coupled. On the underlayer 14, sets of the ferromagnetic film 15, antiparallel coupling film 153, and ferromagnetic film 15 are layered in order. It is preferable to stack 4–12 layers of ferromagnetic films 15 in the main pole. With a small number of layers, there is the fear of reducing the effect that magnetization and reverse magnetization cancel each other at the ends of the magnetic pole. With too many layers, the recording capability decreases. Thus, 6 to 8 layers are most desirable. It is desirable to stack an even number of ferromagnetic film layers so that magnetization and reverse magnetization will cancel each other between adjacent two among the ferromagnetic films disposed to be magnetized in antiparallel directions. On the magnetic head, the air-bearing surface 63 is formed which approaches a magnetic recoding medium and performs magnetic recording and readback.

Figure 14:
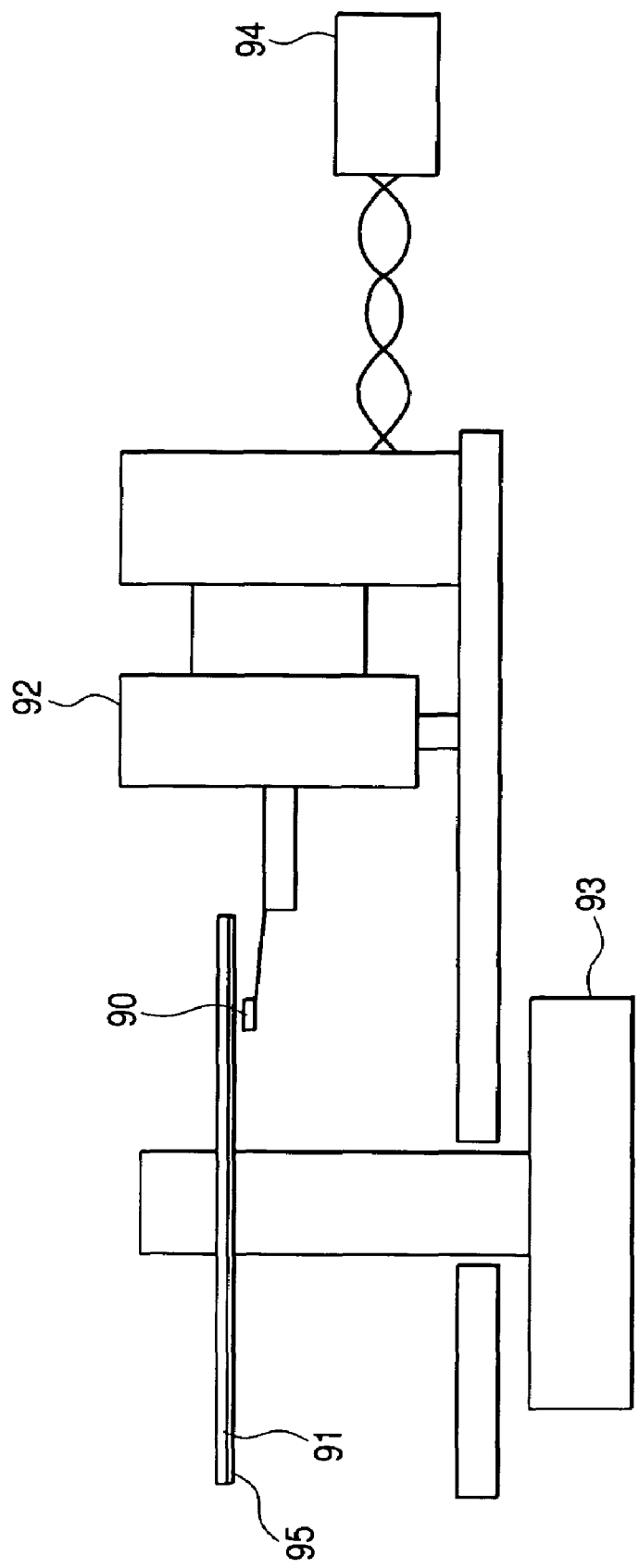
FIG. 14 shows an example of structure of a magnetic recording and readback device using the magnetic head of the present invention.

FIG. 14 shows an example of structure of a magnetic recording and readback device using the magnetic head of the present invention. A disk 95 which supports a recording medium 91 on which information is magnetically recorded is rotated by a spindle motor 93. A head slider 90 is moved and positioned on a track of the disk 95 by an actuator 92. In the magnetic disk drive, a read head and a recording head integrated into the head slider 90 approach specific recording locations on the disk 95 by this mechanism and sequentially write signals onto and read signals from the medium through magnetic interaction.

It is preferable that the actuator 92 is a rotary actuator. Write signals received through a signal processing unit 94 are recorded on the medium by the recording head and an output of the read head is passed through the signal processing unit 94 and retrieved as a signal. When the read head is moved to a target recording track, a high sensitivity output from the read head is used to detect a specific position on the track and control the actuator so that the actuator can position the head slider. While the head slider 90 and the disk 95 are single each in FIG. 14, the device may include a plurality of head sliders and disks. The disk 95 may have a double sided recording medium 91 on which information may be recorded. If information is recorded on either sides of the disk, two head sliders 90 are disposed on the either sides of the disk.

Figure 15A:
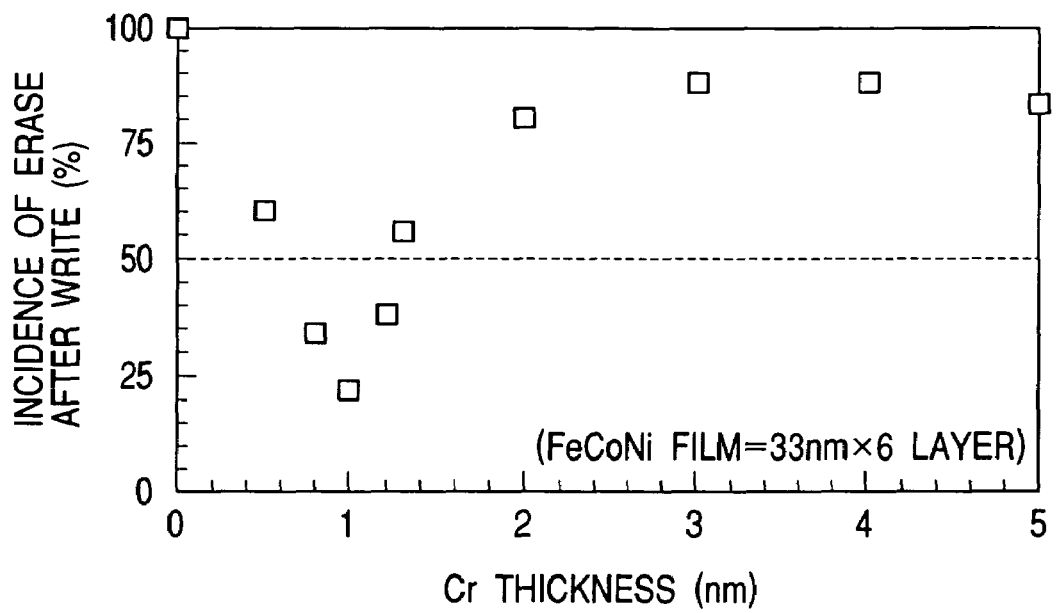
FIGS. 15A and 15B show graphs plotting measurements of an "erase after write" fault incidence, measured for samples of the magnetic head for perpendicular recording in which the soft magnetic multilayer in which ferromagnetic films are antiferromagnetically coupled in accordance with the present invention is employed in the main pole.

FIG. 15 shows graphs plotting measurements of an "erase after write" fault incidence, measured for samples of the magnetic head for perpendicular recording in which the soft magnetic multilayer in which ferromagnetic films are antiferromagnetically coupled in accordance with the present invention is employed in the main pole. FIG. 15A is a graph of the above measurements made for magnetic heads with the thickness of the Cr film which should be the antiparallel coupling layer varying from 0.5 nm to 5 nm, in which antiferromagnetic coupling energy is changed and lost, and a magnetic head using the main pole in which the Cr film thickness is 0 nm, that is, a a single layer structure, which were produced as samples.

For the magnetic head with the single monolayer main pole, the fault incidence is almost 100% and magnetic recording would be impossible to achieve with this head. For the heads with 0.5–1.3 nm thick Cr films, the fault incidence decreased to 50% and below. Especially, for the head with 1 nm thick Cr films, the fault incidence decreased to 25% and below. This indicates that the use of the soft magnetic multilayer in which ferromagnetic films are antiferromagnetically coupled in the main pole is significantly effective for suppressing the "erase after write" faults. There is also shown a tendency that the fault incidence increases as the Cr thickness increases to 1.3 nm and above. For the magnetic heads using the multilayer main pole in which Cr films are so thick, 2 nm and thicker, as to impede antiferromagnetic coupling, the fault incidence is about 80%, thus indicating that normal recording is not performed, though these heads have little effect on improving the fault incidence.

Figure 15B:
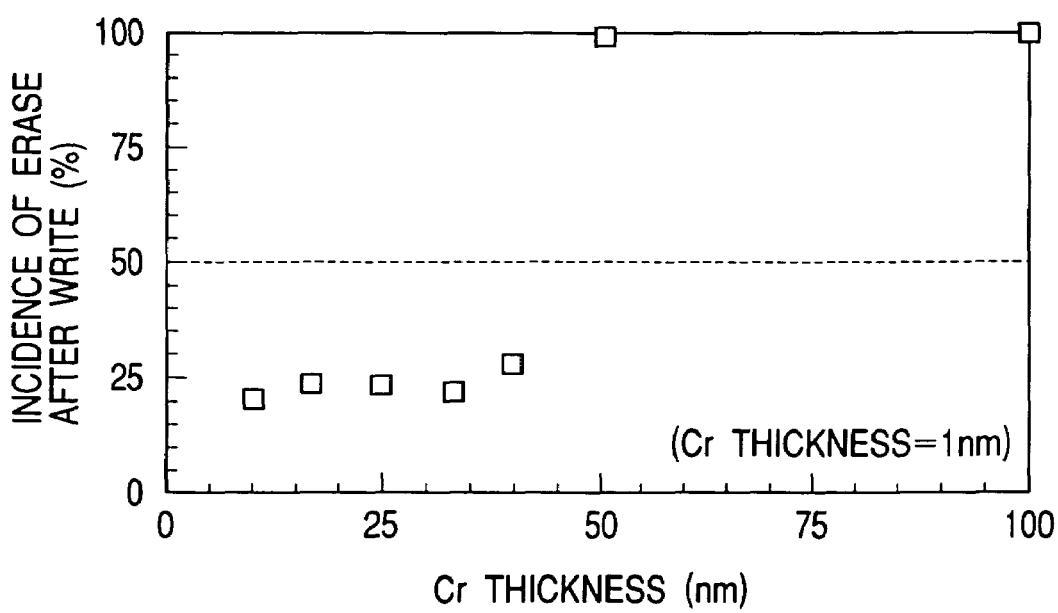

FIG. 15B is a graph of the above fault incidence measurements for heads produced as samples in which a total magnetic film (FeCoNi) thickness in the multilayer is fixed to 200 nm and thickness per FeCoNi layer and the number of layers vary. That is, if thickness per FeCoNi layer is 25 nm, eight layers are stacked; if 33 nm, six layers are stacked in the produced head. Besides, the FeCoNi layers are interleaved with 1 nm thick Cr films to provide maximum antiferromagnetic coupling. With 40 nm and thinner FeCoNi films, all heads show the fault incidence of 25% and below. However, it is apparent that, with 50 nm and thicker FeCoNi films, the fault incidence approximates to 100%. Accordingly, thickness per magnetic layer must be restricted to 50 nm and below.

Meanwhile, as shown in FIG. 4B, there is a tendency that saturation magnetic field energy increases with decrease in the magnetic layer thickness. Through consideration of this result, there is the fear of overwrite deteriorating when the above magnetic films are used in the head. In FIG. 15B, it is seen that sufficient overwrite performance is obtained even with 10 nm thick FeCoNi films. Drawing a conclusion from the above results, 10–50 nm magnetic films are preferable in the multilayer magnetic pole in which these films are antiferromagnetically coupled.

FIG. 16 shows schematic diagrams for explaining the effect of the present invention. In an example in which the main pole of a perpendicular magnetic recording head consists of a single layered ferromagnetic film, after a recoding action, the main pole is magnetized in a magnetic domain state where there is a magnetization vector towards the magnetic recoding medium, as shown in FIG. 16A. The magnetization state where magnetization towards the recoding medium exists is considered as a cause of "erase after write" faults.

For a multilayer main pole consisting of ferromagnetic films, as shown in FIG. 16B, the films are arranged such that they can be magnetized in antiparallel directions with each other, thus making it possible to reduce magnetic flux intrusion to the recording medium. However, in the simply multilayered structure, only demagnetizing fields generated at the ends of the main pole are to produce the state where the films are magnetized in antiparallel. In perpendicular magnetic recording, because a soft magnetic film is employed as the underlayer of the recording medium, it is possible that the magnetic flux is transmitted from the edge of the main pole to the underlayer (FIG. 16C) and it is difficult to produce the desirable closed magnetization state only by the demagnetizing fields generated at the ends of the main pole.

For the magnetic head employing the soft magnetic multilayer in which ferromagnetic films are antiferromagnetically coupled in accordance with the present invention, magnetic properties for producing antiparallel magnetization, that is, antiferromagnetic coupling takes place in the soft magnetic multilayer, as shown in FIG. 16D. Thus, the desired stable magnetization state can be produced in the magnetic pole of the perpendicular magnetic recording head. In this case, between ferromagnetic films in the multilayer, antiferromagnetic coupling exists in addition to magnetostatic coupling at the ends of the main pole, an the multilayer structure as shown in FIG. 16D has the advantage of preventing the magnetic domain states that cause "erase after write" faults.

The soft magnetic multilayer in which ferromagnetic films are antiferromagnetically coupled, used in the present invention has the advantage of producing the stable magnetization state where the films are magnetized in antiparallel with each other. Thus, the above multilayer has the advantage of preventing undesirable magnetic domain states generated by demagnetizing fields which are often found in soft magnetic films having patterned ends. With these advantages, the above multilayer can have other applications than the main pole of the perpendicular magnetic recording head.

Figure 17:
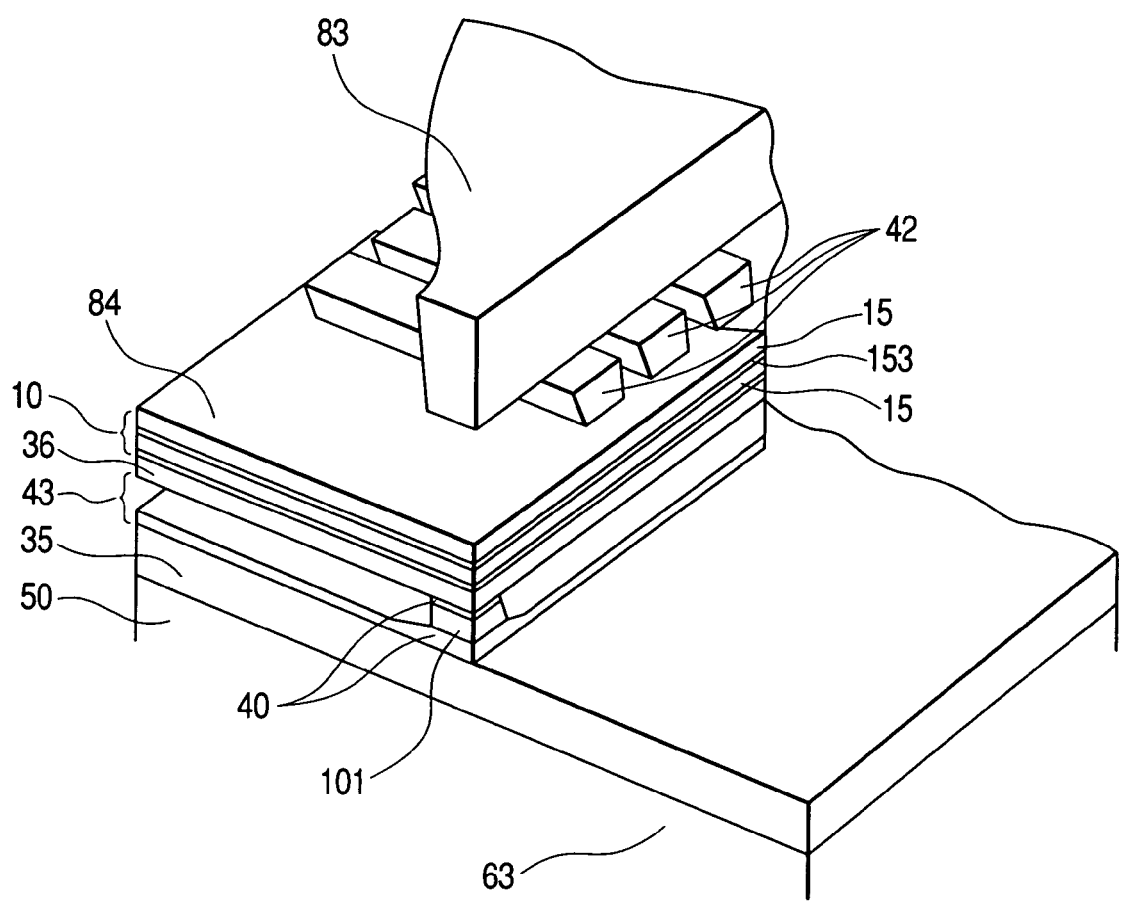
FIG. 17 shows an example of structure of a perpendicular magnetic recording head in which the soft magnetic multilayer in which ferromagnetic films are antiferromagnetically coupled in accordance with the present invention is employed to constitute the return pole.

FIG. 17 shows an example of structure of a perpendicular magnetic recording head in which the soft magnetic multilayer in which ferromagnetic films are antiferromagnetically coupled in accordance with the present invention is employed to constitute the return pole. On the substrate 50 which is integrated with the slider, the lower magnetic shield 35, one electrode 40, and the magnetoresistive multilayer 101 are formed and, moreover, another electrode 40 and the upper magnetic shield 36 are formed, and the read gap 43 which senses a readback signal is formed. While the TMR or CPP-GMR type readback sensor which causes current to flow in the layer thickness direction is shown here as the readback unit, it is possible to use another type of readback sensor such as GMR readback sensors which cause current to flow in the in-plane direction as the readback unit without altering the essential characteristics of the present invention.

The recording head further includes the return pole 84, coils 42, and main pole 83 which form a magnetic circuit. In FIG. 17, the return pole 84 consists of the soft magnetic multilayer 10 in which ferromagnetic films are antiparallel coupled. Sets of the ferromagnetic film 15 and antiparallel coupling film 153 are layered in order. It is preferable to stack 2–12 layers of ferromagnetic films 15 in the return pole. It is desirable to stack an even number of ferromagnetic film layers so that magnetization and reverse magnetization will cancel each other between adjacent two among the ferromagnetic films disposed to be magnetized in antiparallel directions. On the magnetic head, the air-bearing surface 63 is formed which approaches a magnetic recoding medium and performs magnetic recording and readback.

Figure 18:
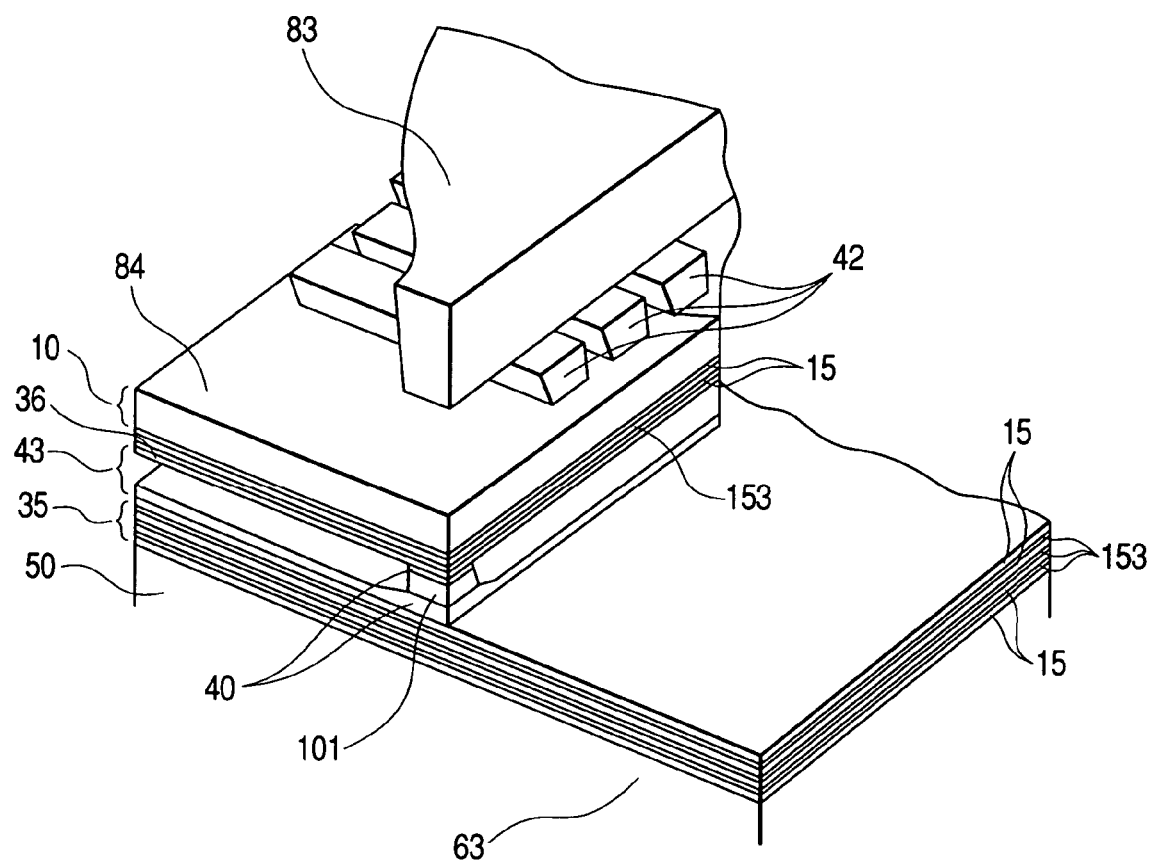
FIG. 18 shows an example of structure of a perpendicular magnetic recording head in which the soft magnetic multilayer in which ferromagnetic films are antiferromagnetically coupled in accordance with the present invention is employed to constitute the magnetic shields.

FIG. 18 shows an example of structure of a perpendicular magnetic recording head in which the soft magnetic multilayer in which ferromagnetic films are antiferromagnetically coupled in accordance with the present invention is employed to constitute the magnetic shields. On the substrate 50 which is integrated with the slider, the lower magnetic shield 35, one electrode 40, and the magnetoresistive multilayer 101 are formed and, moreover, another electrode 40 and the upper magnetic shield 36 are formed, and the read gap 43 which senses a readback signal is formed.

While the TMR or CPP-GMR type readback sensor which causes current to flow in the layer thickness direction is shown here as the readback unit, it is possible to use another type of readback sensor such as GMR readback sensors which cause current to flow in the in-plane direction as the readback unit without altering the essential characteristics of the present invention. The recording head further includes the return pole 84, coils 42, and main pole 83 which form a magnetic circuit.

In FIG. 18, the lower magnetic shield 35 and upper magnetic shield 36 each consist of the soft magnetic multilayer 10 in which ferromagnetic films are antiparallel coupled. Sets of the ferromagnetic film 15 and antiparallel coupling film 153 are layered in order. It is preferable to stack 2–12 layers of ferromagnetic films 15 in the upper or lower magnetic shield. It may be possible to constitute either the upper or lower shield or a part thereof by the above soft magnetic multilayer without contravening the essential characteristics of the present invention.

It is desirable to stack an even number of ferromagnetic film layers so that magnetization and reverse magnetization will cancel each other between adjacent two among the ferromagnetic films disposed to be magnetized in antiparallel directions. On the magnetic head, the air-bearing surface 63 is formed which approaches a magnetic recoding medium and performs magnetic recording and readback. Through constituting the magnetic shields by the soft magnetic multilayer in which ferromagnetic films are antiparallel coupled, variation in the read head output, induced by the magnetic shields, can be reduced.

Figure 19:
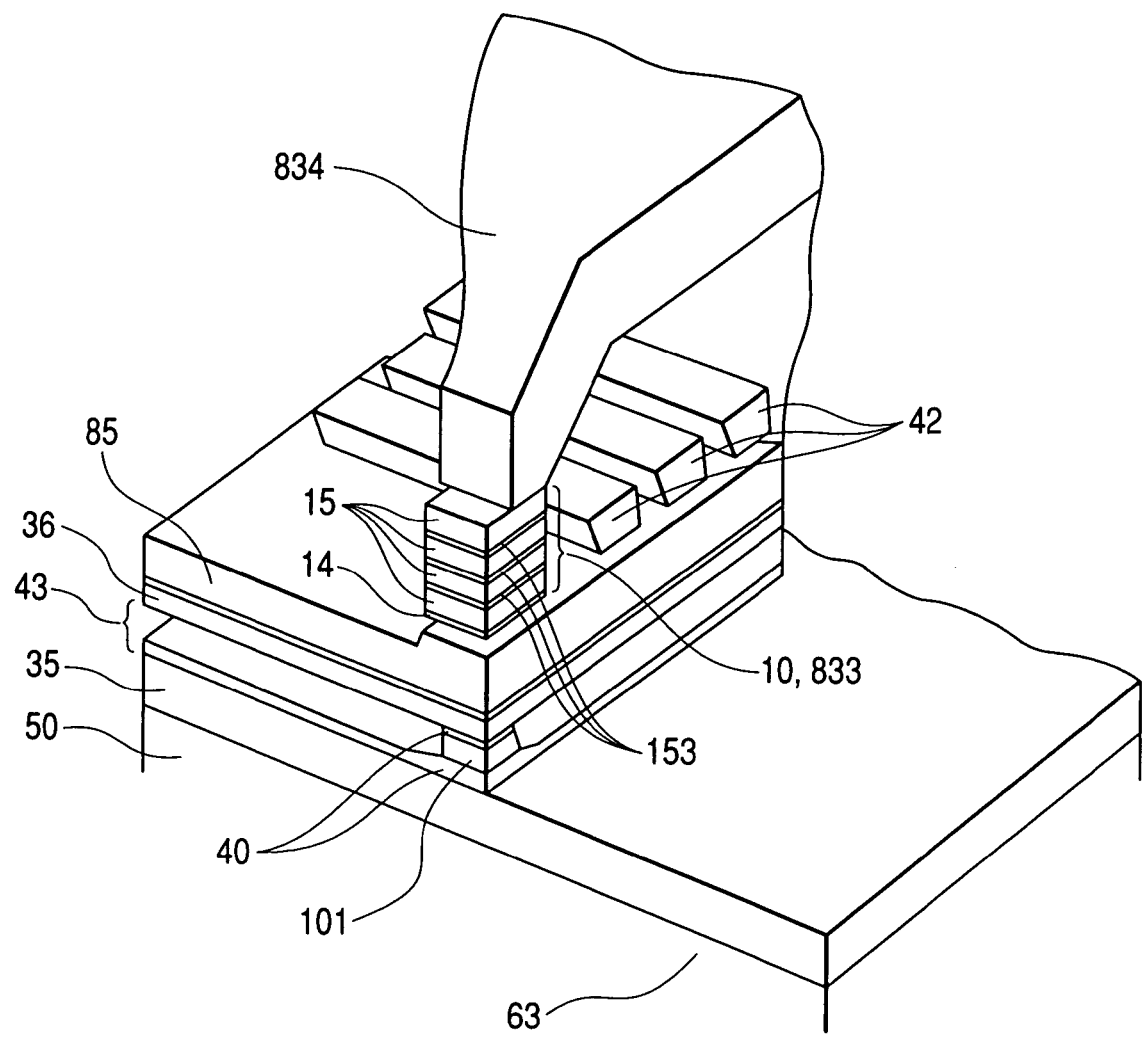
FIG. 19 shows an example of structure of a longitudinal magnetic recording head in which the soft magnetic multilayer in which ferromagnetic films are antiferromagnetically coupled in accordance with the present invention is employed to constitute the tip of an upper magnetic core.

FIG. 19 shows an example of structure of a longitudinal magnetic recording head in which the soft magnetic multilayer in which ferromagnetic films are antiferromagnetically coupled in accordance with the present invention is employed to constitute the tip of an upper magnetic core. On the substrate 50 which is integrated with the slider, the lower magnetic shield 35, one electrode 40, and the magnetoresistive multilayer 101 are formed and, moreover, another electrode 40 and the upper magnetic shield 36 are formed, and the read gap 43 which senses a readback signal is formed.

While the TMR or CPP-GMR type readback sensor which causes current to flow in the layer thickness direction is shown here as the readback unit, it is possible to use another type of readback sensor such as GMR readback sensors which cause current to flow in the in-plane direction as the readback unit without altering the essential characteristics of the present invention. The recording head further includes a lower magnetic core 85, coils 42, a first upper magnetic core 833, and a second upper magnetic core 834 which form a magnetic circuit.

While, the upper magnetic core consists of the first and second upper magnetic cores as shown here, the upper magnetic core may consist of a single unit or three or more units without going against the essential characteristics of the present invention. Through constituting the magnetic core by the soft magnetic multilayer in which ferromagnetic films are antiparallel coupled, the following advantageous effects are obtained: stabilizing the magnetic domain states in the ends, reducing post-recoding noise, and improving the shapes of the ends of recording magnetic fields.

In FIG. 19, the first upper magnetic core 833 consists of the soft magnetic multilayer 10 in which ferromagnetic films are antiparallel coupled. Sets of the ferromagnetic film 15 and antiparallel coupling film 153 are layered in order. It is preferable to stack 2–12 layers of ferromagnetic films 15 in the upper or lower magnetic core. It may be possible to constitute either the upper magnetic core or lower magnetic core or a part thereof by the above soft magnetic multilayer without contravening the essential characteristics of the present invention, but it is desirable to constitute the tip of the upper magnetic core by the above soft magnetic multilayer. It is desirable to stack an even number of ferromagnetic film layers so that magnetization and reverse magnetization will cancel each other between adjacent two among the ferromagnetic films disposed to be magnetized in antiparallel directions. On the magnetic head, the air-bearing surface 63 is formed which approaches a magnetic recording medium and performs magnetic recording and readback.

FIG. 20 shows another example of structure of the soft magnetic multilayer employed in the magnetic head of the present invention. The soft magnetic multilayer 10 in which ferromagnetic films are antiferromagnetically coupled is formed such that the underlayer 14 is formed on the substrate 50 and sets of the ferromagnetic film 15, the antiparallel coupling film 153, the ferromagnetic film 15, and a decoupling film 154 are layered in order repeatedly. The material, thickness, and deposition of the antiparallel coupling film are adjusted so that antiferromagnetic coupling energy is exerted to make adjacent ferromagnetic films 15 magnetized in directions antiparallel with each other across the antiparallel coupling film 153.

Meanwhile, the decoupling film 154 acts to separate adjacent ferromagnetic films 15 and restrain these ferromagnetic films from being magnetized in antiparallel with each other and coupling and made of a different material from the antiparallel coupling film 153 or the same material as the antiparallel coupling film 153 but being thick enough not to cause antiferromagnetic coupling. For example, possible design is to interleave the ferromagnetic films with 1 nm thick Cr antiparallel coupling films 153 and 1 nm thick NiCr decoupling films 154 or 1 nm thick Cr antiparallel coupling films 153 and 3 nm thick Cr decoupling films 154.

As illustrated by the structure example shown in FIG. 20, by forming the soft magnetic multilayer such that each ferromagnetic film 15 is antiferromagnetically coupled with one adjacent ferromagnetic film 15 across an antiparallel coupling film 153 on one interface and is not antiferromagnetically coupled with the other adjacent ferromagnetic film 15 across a decoupling film 154 on the other interface, the soft magnetic multilayer with a high permeability and moderated saturation magnetic field energy can be obtained.

In the case of the soft magnetic multilayer structure shown in FIG. 1, each ferromagnetic film 15 is antiferromagnetically coupled with two adjacent ferromagnetic films on either sides across antiparallel coupling films 153 on both interfaces except the top and bottom end ones and there are many interfaces contributing to antiferromagnetic coupling, and, consequently, great saturation magnetic field energy is generated. By contrast, in the corresponding structure shown in FIG. 20, the number of the interfaces for antiferromagnetic coupling can be reduced roughly by half and the interfaces are arranged in kind of alternation, and, therefore, saturation magnetic field energy can be moderated. The soft magnetic multilayer illustrated in FIG. 20 can be applied to different components of the magnetic head in the same manner as described hereinbefore.

As other embodiments of the present invention, the following magnetic heads were fabricated:

A magnetic head as a thin-film magnetic head for perpendicular magnetic recording including a main pole with its tip facing a magnetic recording medium, a return pole which forms a magnetic circuit in conjunction with the main pole, and coils for exciting the main pole, wherein at least a part of the return pole consists of a soft magnetic multilayer containing laminations, each of which comprises a first ferromagnetic film, a second ferromagnetic film, and an antiparallel coupling layer formed between the first ferromagnetic film and the second ferromagnetic film, wherein the antiparallel coupling layer causes antiferromagnetic interlayer coupling of the first ferromagnetic film and the second ferromagnetic film.

A magnetic head which faces, in close proximity to, a magnetic recording medium on which information has been recorded magnetically, senses magnetic fields leaking from the recording medium, and magnetically records information on the recording medium, the magnetic head including a substrate, a lower magnetic shield, a lower gap, a read element, an upper gap, and an upper magnetic shield which are formed on the substrate, wherein the lower magnetic shield and the upper magnetic shield form a magnetic read gap of a predetermined clearance, wherein at least a part of the lower magnetic shield and the upper magnetic shield consists of a soft magnetic multilayer containing laminations, each of which comprises a first ferromagnetic film, a second ferromagnetic film, and an antiparallel coupling layer formed between the first ferromagnetic film and the second ferromagnetic film, wherein the antiparallel coupling layer causes antiferromagnetic interlayer coupling of the first ferromagnetic film and the second ferromagnetic film.

A magnetic head which faces, in close proximity to, a magnetic recording medium on which information has been recorded magnetically, senses magnetic fields leaking from the recording medium, and magnetically records information on the recording medium, the magnetic head including a substrate, a magnetic yoke, and a read element which are formed on the substrate and a magnetic circuit through which the magnetic yoke passes magnetic fields from the recording medium surface on which the magnetic head faces on to the read element is formed, wherein at least a part of the magnetic yoke consists of a soft magnetic multilayer containing laminations, each of which comprises a first ferromagnetic film, a second ferromagnetic film, and an antiparallel coupling layer formed between the first ferromagnetic film and the second ferromagnetic film, wherein the antiparallel coupling layer causes antiferromagnetic interlayer coupling of the first ferromagnetic film and the second ferromagnetic film.

A magnetic head which faces, in close proximity to, a magnetic recording medium on which information has been recorded magnetically, senses magnetic fields leaking from the recording medium, and magnetically records information on the recording medium, wherein at least a part of magnetic cores or magnetic shields of the magnetic head consists of a soft magnetic multilayer containing laminations, each of which comprises a first ferromagnetic film, a second ferromagnetic film, and an antiparallel coupling layer formed between the first ferromagnetic film and the second ferromagnetic film, wherein the first ferromagnetic film and the second ferromagnetic film are made of FeCo or FeCoNi alloy having a body centered cubic structure, the antiparallel coupling layer causes antiferromagnetic interlayer coupling of the first ferromagnetic film and the second ferromagnetic film, the antiparallel coupling layer is made of Ru or Ru alloy, and the thickness of the antiparallel coupling layer falls within a range from 1.8 nm to 3 nm.

A magnetic head which faces, in close proximity to, a magnetic recording medium on which information has been recorded magnetically, senses magnetic fields leaking from the recording medium, and magnetically records information on the recording medium, wherein at least a part of magnetic cores or magnetic shields of the magnetic head consists of a soft magnetic multilayer containing laminations, each of which comprises a first ferromagnetic film, a second ferromagnetic film, and an antiparallel coupling layer formed between the first ferromagnetic film and the second ferromagnetic film, wherein the first ferromagnetic film and the second ferromagnetic film are made of NiFe, CoFe or CoNiFe alloy having a face centered cubic structure, the antiparallel coupling layer causes antiferromagnetic interlayer coupling of the first ferromagnetic film and the second ferromagnetic film, the antiparallel coupling layer is made of Ru or Ru alloy, and the thickness of the antiparallel coupling layer falls within a range from 0.5 nm to 1.2 nm.

Tests were made on the magnetic heads of the present invention fabricated as described above and the magnetic recording and readback devices on which these magnetic heads are mounted and the test results indicated sufficient outputs, good recording/readback performances, and quite reliable operation.

As detailed hereinbefore, magnetic heads featuring stable magnetization can be obtained in accordance with the present invention. Especially, perpendicular magnetic recording heads in which "erase after write" faults are restrained can be obtained.

TABLE 1

| FERRO-MAGNETIC FILM (THICKNESS) | ANTIPARALLEL COUPLING FILM (THICKNESS) | Bs OF FERRO-MAGNETIC FILM | CRYSTAL STRUCTURE |
|---|---|---|---|
| FeCoNi (20–50 nm) | Cr (1 nm) | 2.0 T | bcc |
| FeCo (5–20 nm) | Ru (1.8–2.0 nm) | 2.4 T | bcc |
| FeCo (30–50 nm) | Ru (0.8 nm) | 2.4 T | bcc |
| NiFe (40–50 nm) | Ru (0.8 nm) | 1.0 T | fcc |
| CoFe (NON-PROPER VALUE) | Ru (0.8 nm) | 1.8 T | fcc |

What is claimed is:

1. A magnetic head, comprising: a thin-film magnetic head for perpendicular magnetic recording, said thin-film magnetic head including a main pole with its tip facing a magnetic recording medium and coils for exciting said main pole, wherein the tip of or at least a part of said main pole includes a soft magnetic multilayer containing laminations, each of which comprises a first ferromagnetic film, a second ferromagnetic film, and an antiparallel coupling layer formed between said first ferromagnetic film and said second ferromagnetic film, wherein said antiparallel coupling layer causes antiferromagnetic interlayer coupling of said first ferromagnetic film and said second ferromagnetic film, and further wherein a saturated magnetic field of said soft magnetic multilayer containing laminations falls within a range from 20 Oe to 400 Oe, a thickness of each said ferromagnetic film falls within a range from 5 nm to 50 nm, a total thickness of said laminations is less than 2 μm, and the number of layers of said ferromagnetic film of said main pole is from 4 to 12.

2. The magnetic head as recited in claim 1, wherein said main pole comprises the soft magnetic multilayer in which said laminations are layered in parallel with a plane facing a magnetic recording medium.

3. The magnetic head as recited in claim 1, wherein said soft magnetic multilayer includes said laminations which are layered, interleaved with antiparallel coupling films.

4. The magnetic head as recited in claim 1, wherein said first ferromagnetic film and said second ferromagnetic film include at least one substance among Co, Ni, and Fe.

5. The magnetic head as recited in claim 1, wherein said antiparallel coupling layer includes at least one substance among Cr, Ru, Os, Re, Rh, and Cu.

6. The magnetic head as recited in claim 1, wherein a thickness of said antiparallel coupling layer falls within a range from 0.5 nm to 1.2 nm.

7. The magnetic head as recited in claim 1, wherein a thickness of said antiparallel coupling layer falls within a range from 1.8 nm to 3 nm.

8. The magnetic head as recited in claim 1, wherein said first ferromagnetic film and said second ferromagnetic film are magnetized in antiparallel directions across said antiparallel coupling layer.

9. The magnetic head as recited in claim 1, wherein said antiferromagnetic interlayer coupling has a field correspondent to several dozen to several hundred oersteds.

10. The magnetic head as recited in claim 1, wherein said first ferromagnetic film and said second ferromagnetic film are deposited through a vacuum thin film deposition process and formed on an underlayer, about 5 nm thick, made of NiCr or other suitable substances in the same vacuum deposition process, and a film surface flatness of the antiparallel coupling layer is flat to a degree that the flatness is less than the thickness of said antiparallel coupling layer.

11. The magnetic head as recited in claim 1, further including a read head which senses magnetic fields.

12. The magnetic head as recited in claim 1, wherein said total thickness of said laminations is less than 1 μm.

13. A magnetic head, comprising: a thin-film magnetic head for perpendicular magnetic recording, said thin-film magnetic head including a main pole with its tip facing a magnetic recording medium and coils for exciting said main pole, wherein the tip of or at least a part of said main pole includes soft magnetic multilayers containing laminations, each of which comprises a first ferromagnetic film, a second ferromagnetic film, and an antiparallel coupling layer formed between said first ferromagnetic film and said second ferromagnetic film, wherein said antiparallel coupling layer causes antiferromagnetic interlayer coupling of said first ferromagnetic film and said second ferromagnetic film, and further wherein said soft magnetic multilayers include said laminations which are layered, interleaved with non-magnetic decoupling films.

14. The magnetic head as recited in claim 13, wherein said main pole comprises the soft magnetic multilayer in which said laminations are layered in parallel with a plane facing a magnetic recording medium.

15. The magnetic head as recited in claim 13, wherein said first ferromagnetic film and said second ferromagnetic film include at least one substance among Co, Ni, and Fe.

16. The magnetic head as recited in claim 13, wherein said antiparallel coupling layer includes at least one substance among Cr, Ru, Os, Re, Rh, and Cu.

17. The magnetic head as recited in claim 13, wherein a thickness of said antiparallel coupling layer falls within a range from 0.5 nm to 1.2 nm.

18. The magnetic head as recited in claim 13, wherein a thickness of said antiparallel coupling layer falls within a range from 1.8 nm to 3 nm.

19. The magnetic head as recited in claim 13, wherein said first ferromagnetic film and said second ferromagnetic film are magnetized in antiparallel directions across said antiparallel coupling layer.

20. The magnetic head as recited in claim 13, wherein said antiferromagnetic interlayer coupling has a field correspondent to several dozen to several hundred oersteds.

21. The magnetic head as recited in claim 13, wherein said first ferromagnetic film and said second ferromagnetic film are deposited through a vacuum thin film deposition process and formed on a underlayer, about 5 nm thick, made of NiCr or other suitable substances in the same vacuum deposition process, and a film surface flatness of the antiparallel coupling layer is flat to a degree that the flatness is less than the thickness of said antiparallel coupling layer.

22. The magnetic head as recited in claim 13, further comprising a read head which senses magnetic fields.

23. A magnetic head, comprising: a thin-film magnetic head for perpendicular magnetic recording, said thin-film magnetic head including a main pole with its tip facing a magnetic recording medium and coils for exciting said main pole, wherein the tip of or at least a part of said main pole includes a soft magnetic multilayer containing laminations, each of which comprises a first ferromagnetic film, a second ferromagnetic film, and an antiparallel coupling layer formed between said first ferromagnetic film and said second ferromagnetic film, wherein said first ferromagnetic film and said second ferromagnetic film comprise Fe and Co as principal constituents and have a crystal structure which is a body centered cubic structure, said antiparallel coupling layer causes antiferromagnetic interlayer coupling of said first ferromagnetic film and said second ferromagnetic film and is a metal layer comprising Cr or Ru as a principal constituent or an alloy layer doped with another element of 20 atomic percent and below, and the thickness of said antiparallel coupling layer falls within a range from 0.5 nm to 1.2 nm or a range from 1.8 nm to 3 nm, and further wherein a saturated magnetic field of said soft magnetic multilayer containing laminations falls within a range from 20 Oe to 400 Oe, a thickness of each said ferromagnetic film falls within a range from 5 nm to 50 nm, a total thickness of said laminations is less than 2 μm, and the number of layers of said ferromagnetic film of said main pole is from 4 to 12.

24. The magnetic head as recited in claim 23, wherein said total thickness of said laminations is less than 1 μm.

25. A magnetic head which faces, in close proximity to, a magnetic recording medium on which information has been recorded magnetically, senses magnetic fields leaking from said recording medium, and magnetically records information on said recording medium, wherein at least a part of magnetic cores or magnetic shields of said magnetic head includes a soft magnetic multilayer containing laminations, each of which comprises a first ferromagnetic film, a second ferromagnetic film, and an antiparallel coupling layer formed between said first ferromagnetic film and said second ferromagnetic film, wherein said first ferromagnetic film and said second ferromagnetic film are made of FeCo or FeCoNi alloy having a body centered cubic structure, said antiparallel coupling layer causes antiferromagnetic interlayer coupling of said first ferromagnetic film and said second ferromagnetic film, said antiparallel coupling layer is made of Cr, Ru, Cr alloy, or Ru alloy, and the thickness of said antiparallel coupling layer falls within a range from 0.5 nm to 1.2 nm, and further wherein a saturated magnetic field of said soft magnetic multilayer containing laminations falls within a range from 20 Oe to 400 Oe, a thickness of each said ferromagnetic film falls within a range from 5 nm to 50 nm, a total thickness of said laminations is less than 2 μm, and the number of layers of said ferromagnetic film is from 4 to 12.

26. The magnetic head as recited in claim 25, wherein said total thickness of said laminations is less than 1 μm.

27. A magnetic head, comprising: a thin-film magnetic head for perpendicular magnetic recording, said thin-film magnetic head including a main pole with its tip facing a magnetic recording medium and coils for exciting said main pole, wherein the tip of or at least a part of said main pole includes soft magnetic multilayers containing laminations, each of which comprises a first ferromagnetic film, a second ferromagnetic film, and an antiparallel coupling layer formed between said first ferromagnetic film and said second ferromagnetic film, wherein said first ferromagnetic film and said second ferromagnetic film comprise Fe and Co as principal constituents and have a crystal structure which is a body centered cubic structure, said antiparallel coupling layer causes antiferromagnetic interlayer coupling of said first ferromagnetic film and said second ferromagnetic film and is a metal layer comprising Cr or Ru as a principal constituent or an alloy layer doped with another element of 20 atomic percent and below, and the thickness of said antiparallel coupling layer falls within a range from 0.5 nm to 1.2 nm or a range from 1.8 nm to 3 nm, and further wherein said soft magnetic multilayers include said laminations which are layered, interleaved with nonmagnetic decoupling films.

* * * * *